(12) United States Patent
Tame et al.

(10) Patent No.: US 8,449,034 B2
(45) Date of Patent: May 28, 2013

(54) FULL MEMORY I-DISK

(75) Inventors: Omar D. Tame, West Bloomfield, MI (US); Randolph P. Villarroel, Brampton (CA)

(73) Assignee: Magna Seating Inc., Aurora, Ontario (CA)

( * ) Notice: Subject to any disclaimer, the term of this patent is extended or adjusted under 35 U.S.C. 154(b) by 371 days.

(21) Appl. No.: 12/812,855

(22) PCT Filed: Jan. 26, 2009

(86) PCT No.: PCT/CA2009/000072
§ 371 (c)(1),
(2), (4) Date: Jul. 14, 2010

(87) PCT Pub. No.: WO2009/092161
PCT Pub. Date: Jul. 30, 2009

(65) Prior Publication Data
US 2010/0308635 A1    Dec. 9, 2010

Related U.S. Application Data

(60) Provisional application No. 61/023,154, filed on Jan. 24, 2008.

(51) Int. Cl.
*B60N 2/02* (2006.01)
(52) U.S. Cl.
USPC ................................. 297/367 R; 297/378.12
(58) Field of Classification Search
USPC ......................................... 297/367 R, 378.12
See application file for complete search history.

(56) References Cited

U.S. PATENT DOCUMENTS

| | | | |
|---|---|---|---|
| 5,522,643 A * | 6/1996 | Matsuura | 297/367 R |
| 5,611,599 A | 3/1997 | Baloche et al. | |
| 6,007,153 A * | 12/1999 | Benoit et al. | 297/378.12 |
| 6,082,821 A | 7/2000 | Baloche et al. | |
| 6,095,608 A | 8/2000 | Ganot et al. | |
| 6,199,953 B1 * | 3/2001 | Chen | 297/367 R |
| 6,454,354 B1 | 9/2002 | Vossmann et al. | |
| 6,619,744 B2 | 9/2003 | Reubeuze | |
| 7,055,906 B2 | 6/2006 | Shinozaki | |
| 7,648,205 B2 * | 1/2010 | Zou et al. | 297/367 R |
| 2008/0048478 A1 | 2/2008 | Koumura | |

FOREIGN PATENT DOCUMENTS

| | | | |
|---|---|---|---|
| JP | 2008212538 A | 9/2008 | |
| WO | 2007000041 A2 | 1/2007 | |

* cited by examiner

*Primary Examiner* — Laurie Cranmer
(74) *Attorney, Agent, or Firm* — Miller Canfield

(57) ABSTRACT

A disc recliner for pivoting a seat back relative to a seat cushion includes a fixed plate mounted to the seat cushion and a movable plate mounted to the seat back. The disc recliner includes a locking mechanism operable between a locked condition coupling the fixed and movable plates and an unlocked condition uncoupling the fixed and movable plates to allow rotation of the movable plate relative to the fixed plate. The disc recliner includes a memory plate that is disengaged with the movable plate to allow pivotal adjustment of the seat back between a plurality of seating positions by actuating the locking mechanism to the unlocked condition. The memory plate engages the movable plate to identify a previously selected seating position and to maintain the locking mechanism in the unlocked condition thereby allowing pivotal movement of the seat back between the previously selected seating position and a folded position.

38 Claims, 24 Drawing Sheets

"FULL MEMORY I-DISK"

CROSS-REFERENCE TO RELATED APPLICATION

This application claims priority to and all the benefits of U.S. Provisional Application No. 61/023,154, filed on Jan. 24, 2008 and entitled "Full Memory I-Disc."

BACKGROUND OF THE INVENTION

1. Field of the Invention

The invention relates to a recliner assembly for an automotive vehicle seat that provides adjustment of a seat back relative to a seat cushion. More particularly, the invention relates to a disc recliner having a memory function.

2. Description of Related Art

Automotive vehicles include seat assemblies for supporting a seated occupant in the vehicle. Each seat assembly includes a generally horizontal seat cushion and a seat back operatively coupled to the seat cushion by a recliner assembly. The recliner assembly allows for adjustment of the seat back relative to the seat cushion between a plurality of reclined seating positions. Typically, the recliner assembly also allows the seat back to pivot forwardly to an easy entry or dump position to improve ingress and egress to a rear seat or storage area behind the seat assembly. The recliner assembly may also allow the seat back to pivot forwardly to a fold flat or stowed position overlying the seat cushion.

It is common that the recliner assembly includes a pair of disc recliners to operatively couple the seat back to the seat cushion. Generally, a typical disc recliner includes a fixed disc secured to the seat cushion and a movable disc secured to the seat back and rotatably coupled to the fixed disc. The disc recliner also includes a locking mechanism for maintaining the angular or reclined seating position of the seat back relative to the seat cushion. One type of locking mechanism includes an annular rim of teeth on the movable disc and one or more pawls with a plurality of teeth. The pawls are movable, either slidably or pivotally, in a radial direction between a locked position and an unlocked position. With the pawls in the locked position, the teeth on the pawls are engaged with the rim of teeth on the movable disc, thus locking the angular position of the seat back relative to the seat cushion. When the pawls are moved from the locked position to the unlocked position, the teeth on the pawls are disengaged with the rim of teeth on the movable disc, thus allowing adjustment of the seat back relative to the seat cushion between the plurality of reclined seating positions. Alternatively, when the pawls are moved from the locked position to the unlocked position, the seat back can be pivoted forwardly toward the seat cushion into the easy entry position or stowed position. Once ingress or egress to the rear seat or storage area is no longer desired, it is desirable to return the seat back to the previously selected reclined seating position. To do so, disc recliners include a memory feature, however, disc recliners with memory features are very complex and therefore expensive.

It is desirable, therefore, to provide a simple and robust disc recliner that is operatively coupled between a seat back and seat cushion for allowing selective pivotal adjustment of the seat back between a plurality of reclined seating positions and a forwardly folded position. It is also desirable that the disc recliner include a memory feature for returning the seat back to the previously selected reclined seating position after the seat back has been moved to the forwardly folded position.

SUMMARY OF THE INVENTION

According to one aspect of the invention, a disc recliner is provided which allows adjustment of a seat back relative to a seat cushion between a plurality of reclined seating positions. Further, the disc recliner has internal means for providing a memory function that returns the seat back to a previously selected reclined seating position after pivoting the seat back to an easy entry position or a forwardly folded stowed position overlying the seat cushion.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
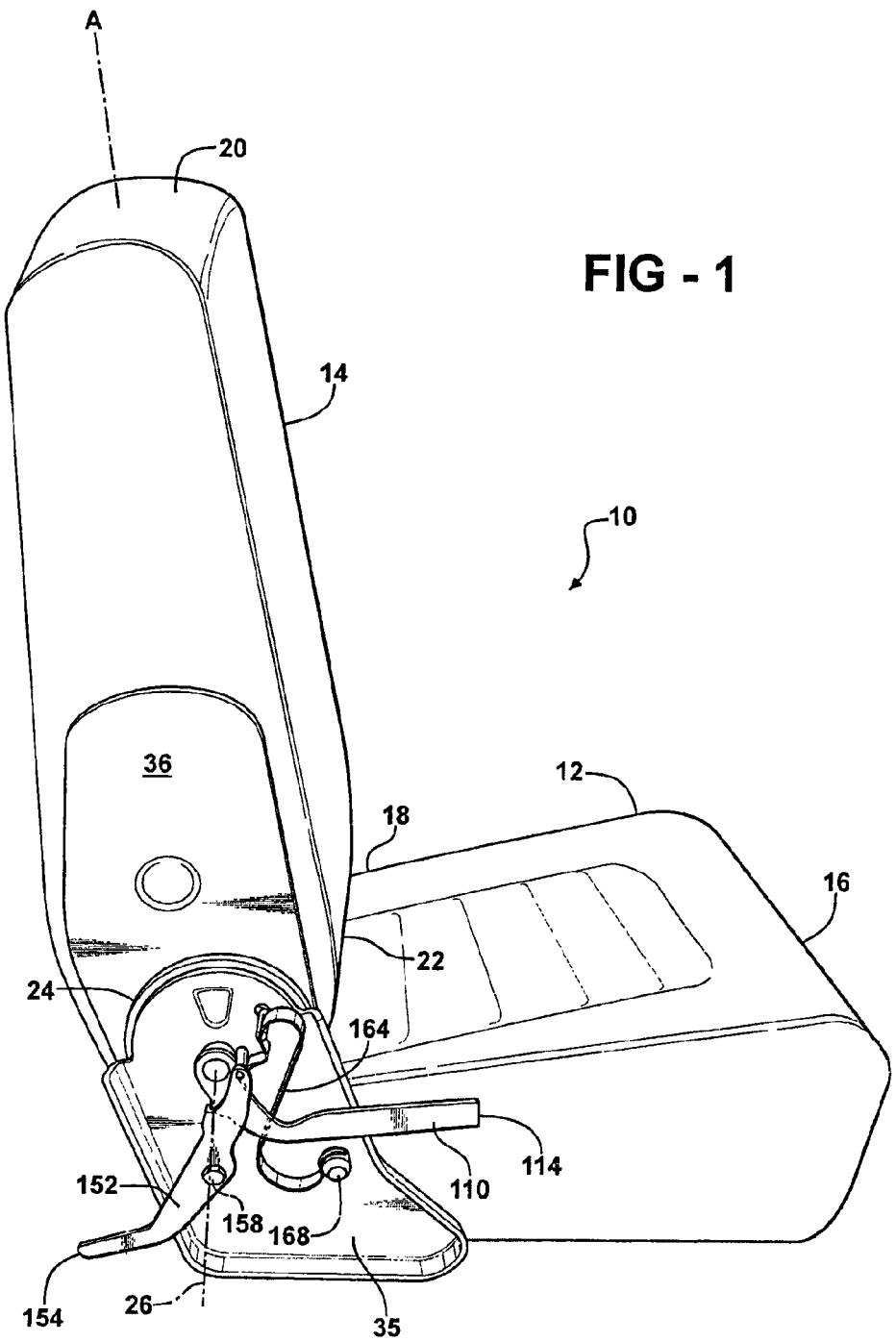
FIG. 1 is an outer side perspective view of a vehicle seat assembly including a disc recliner according to one embodiment of the invention.

Referring to the Figures, FIG. 1 discloses a seat assembly 10 for use in an automotive vehicle. The seat assembly 10 includes a generally horizontal seat cushion 12 and a seat back 14 for supporting an occupant on the seat assembly 10. The construction of each of the seat cushion 12 and seat back 14 includes a rigid frame structure for supporting a contoured, foam pad encased by a trim cover as known to one skilled in the art. The seat cushion 12 has opposite and spaced apart front and rear ends 16, 18. The seat back 14 has opposite and spaced apart upper and lower ends 20, 22. As is conventional in the art, the seat back 14 is operatively coupled at its lower end 22 to the rear end 18 of the seat cushion 12 by a pair of synchronized disc recliners 24 (one shown). It is contemplated that only disc recliner 24 may be used without varying from the scope of the invention.

The disc recliners 24 allow for pivotal or angular adjustment of the seat back 14 about a laterally extending pivot axis 26 between a plurality of reclined seating positions, one of which is shown at A in FIG. 1. The disc recliners 24 also allow for pivotal movement of the seat back 14 about the pivot axis 26 between any one of the plurality of reclined seating positions and a forwardly folded stowed position, overlying the seat cushion 12, shown at B in FIG. 10. Preferably, the seat back 14 is biased towards the stowed position.

It is appreciated that in the alternative, the seat back 14 may pivot between any one of the plurality of reclined seating positions and an easy entry or dump position, as is well known to one skilled in the art. The easy entry position is defined as a forwardly inclined position between an upright seating position and the stowed position.

Figure 12:
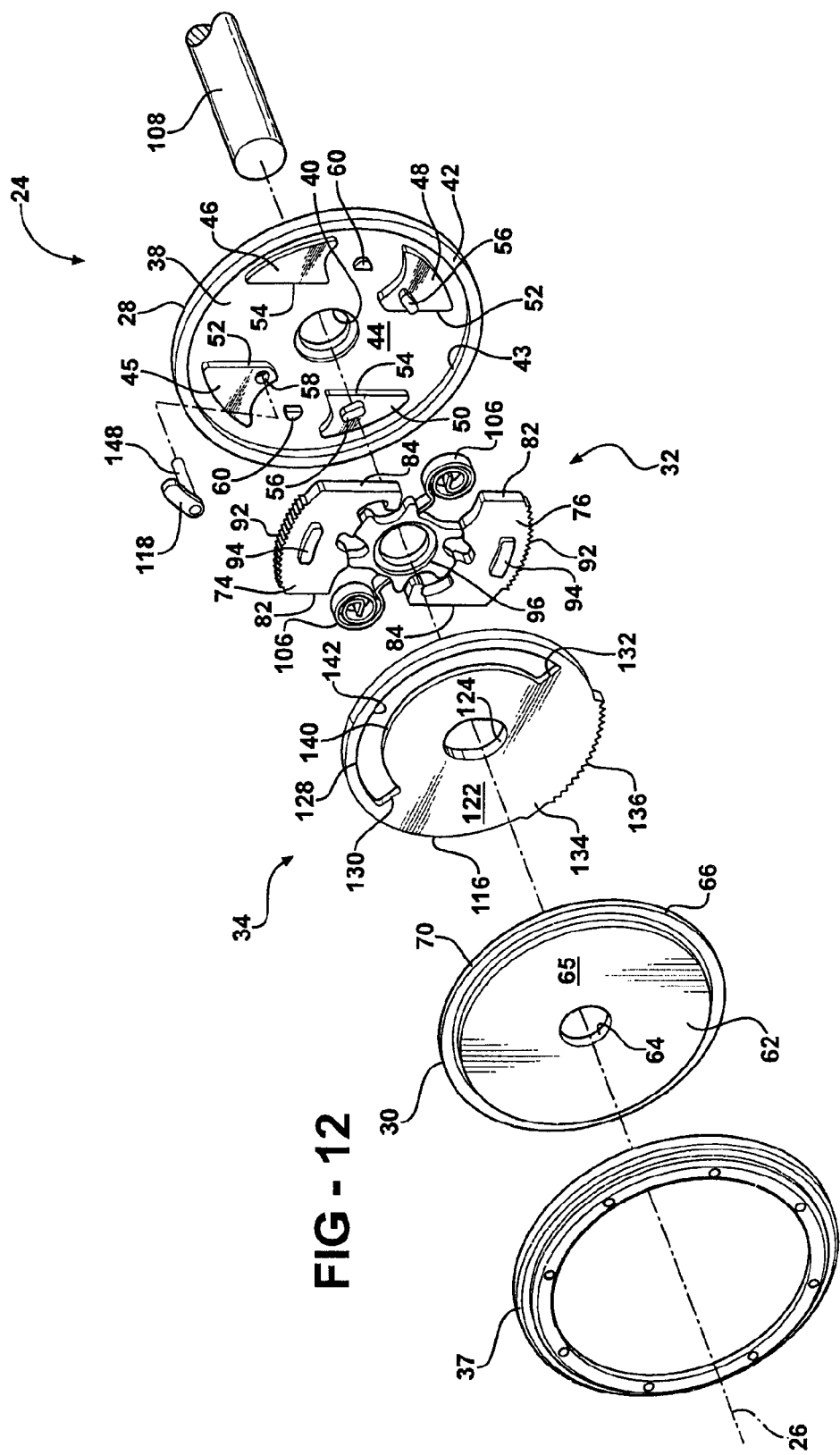
FIG. 12 is an exploded, inner perspective view of the disc recliner.
Figure 13:
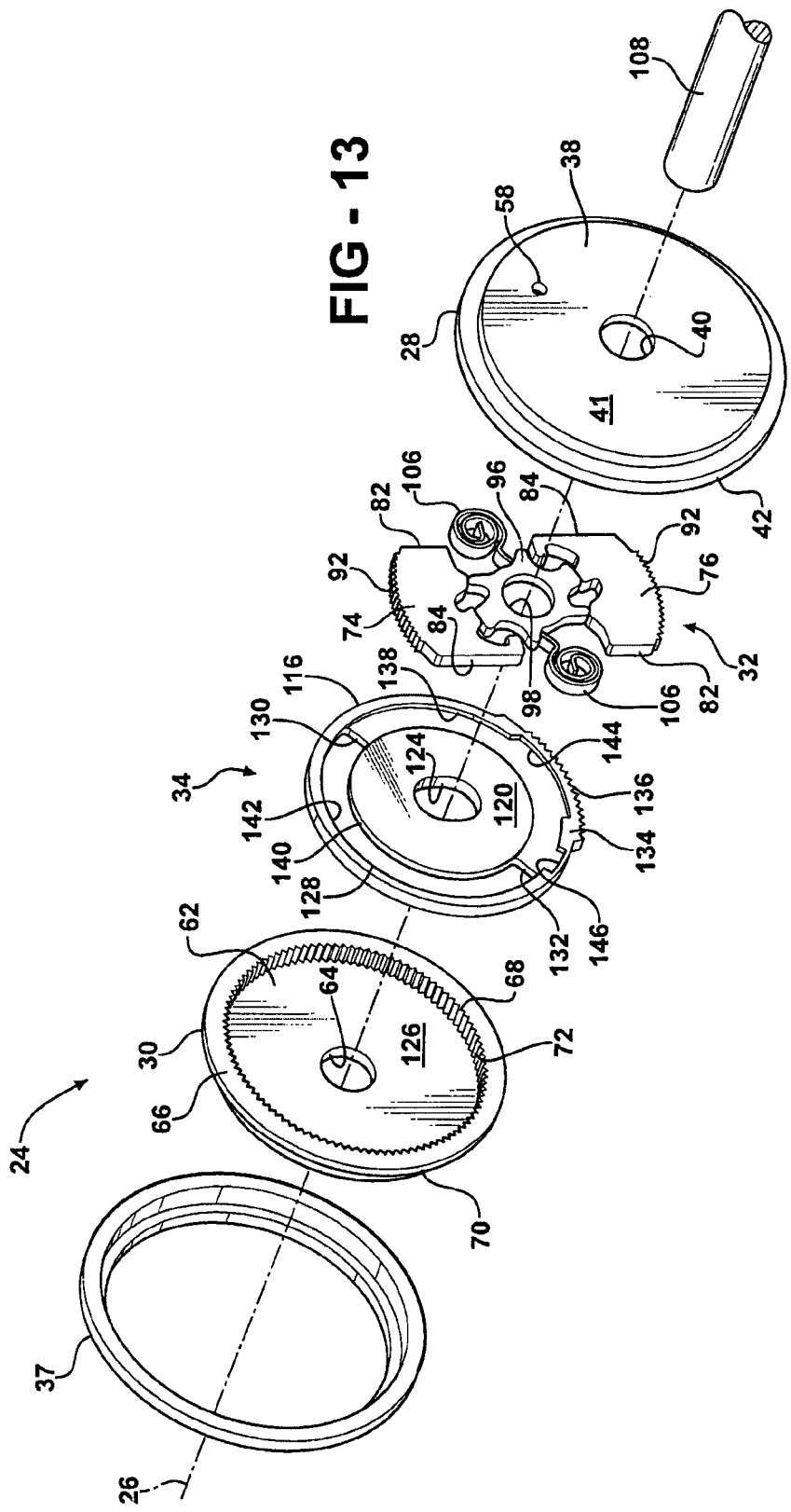
FIG. 13 is an exploded, outer perspective view of the disc recliner.

Referring to FIGS. 12 and 13, one of the disc recliners 24 is illustrated in detail. The disc recliner 24 generally includes a fixed or guide plate 28, a movable or toothed plate 30, a locking mechanism 32, and a memory mechanism 34. The fixed plate 28 is adapted to be mounted to a seat cushion bracket 35, shown in FIG. 1. The seat cushion bracket 35 in turn is coupled to the seat cushion 12. The movable plate 30 is adapted to be mounted to a seat back bracket 36, also shown in FIG. 1. The seat back bracket 36 in turn is coupled to the seat back 14. The fixed plate 28 and the movable plate 30 are held together by a retaining ring 37 in a manner well known in the art such that the movable plate 30 can rotate relative to the fixed plate 28.

The fixed plate 28 is circular, generally cup-shaped, and includes an end wall 38 having a first central bore 40 extending axially therethrough. The first central bore 40 is coaxial with the pivot axis 26. An outer face 41 of the end wall 38 is fixedly secured to the seat cushion bracket 35 by any suitable means. An axially extending wall or flange 42 is disposed circumferentially around the fixed plate 28 and defines an inner surface 43. An inner face 44 of the end wall 38 includes a series of embossments, specifically a first embossment 45, a second embossment 46, a third embossment 48, and a fourth embossment 50. The first and second embossments 45, 46 define opposing first and second guide surfaces 52, 54. Similarly, the third and fourth embossments 48, 50 also define opposing first and second guide surfaces 52, 54. The first guide surfaces 52 are spaced apart from and generally parallel to the opposing second guide surfaces 54. Each of the third and fourth embossments 48, 50 include a small, arcuate tab 56 protruding therefrom, the purpose of which will become apparent below. A secondary bore 58 extends axially through the first embossment 45, offset from and generally parallel to the first central bore 40. A pair of diametrically opposed posts 60 are mounted on the inner face 44 of the end wall 38 between the first and fourth embossments 45, 50 and the second and third embossments 46, 48, respectively.

The movable plate 30 is circular, generally cup-shaped, and includes an end wall 62 having a second central bore 64 extending axially therethrough. The second central bore 64 is coaxial with the pivot axis 26. An outer face 65 of the end wall 62 is fixedly secured to the seat back bracket 36 by any suitable means. An axially extending wall or flange 66 is disposed circumferentially around the movable plate 30 and defines an inner surface 68 and an outer surface 70. The inner surface 68 includes a plurality of teeth 72 disposed therearound. The outer surface 70 of the movable plate 30 cooperates with the inner surface 43 of the fixed plate 28 to rotatably guide the movable plate 30.

The locking mechanism 32 is provided for controlling pivotal movement of the seat back 14 relative to the seat cushion 12. More specifically, the locking mechanism 32 is operable between a locked condition and an unlocked condition. In the locked condition, the fixed plate 28 and the movable plate 30 are coupled together to prevent pivotal movement of the seat back 14. In the unlocked condition, the fixed plate 28 and the movable plate 30 are uncoupled to allow rotation of the movable plate 30 relative to the fixed plate 28, thereby allowing pivotal movement of the seat back 14 relative to the seat cushion 12. The locking mechanism 32 includes a pair of toothed pawls 74, 76 slidably mounted on the inner face 44 of the fixed plate 28. It is appreciated that the locking mechanism 32 may include any number of pawls without varying from the scope of the invention.

Figure 14:
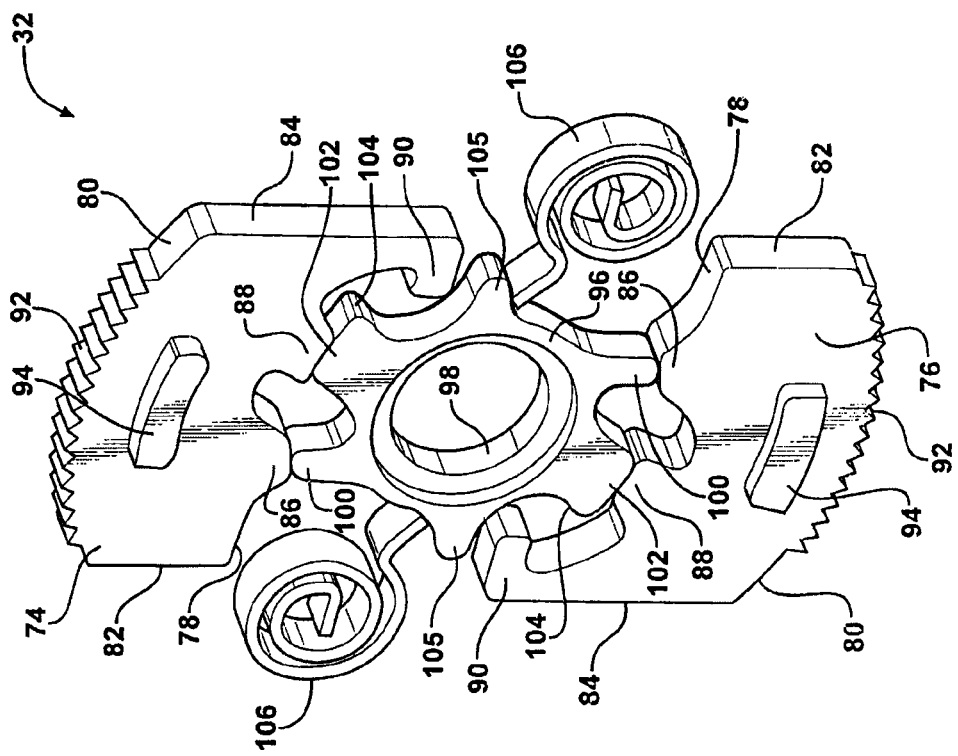
FIG. 14 is an inner perspective view of the locking mechanism of the disc recliner.

Referring to FIG. 14, each of the pawls 74, 76 include an inner peripheral edge 78, an outer peripheral edge 80, a first slide surface 82, and a second slide surface 84. The inner peripheral edge 78 has a cam follower surface defined by first and second lobes 86, 88 and a release hook 90. The outer peripheral edge 80 is generally convex and has a plurality of pawl teeth 92 that are complementary to the teeth 72 on the movable plate 30. The first and second slide surfaces 82, 84 are on opposite sides of the respective pawl 74, 76 and extend generally parallel to each other. The first slide surface 82 slidably engages the first guide surface 52 and the second slide surface 84 slidably engages the second guide surface 54. The second slide surface 84 is longer in length than the first slide surface 82. Similarly, the second guide surface 54 is longer than the first guide surface 52, thereby configuring the fixed plate 28 to the shape of the pawls 74, 76. Each of the pawls 74, 76 also include an elongated arcuate tab 94 protruding from a side opposite to the side in sliding contact with the inner face 44 of the fixed plate 28. Each elongated tab 94 is spaced radially inward from the outer peripheral edge 80 of the respective pawl 74, 76.

A cam 96 having a third central bore 98 coaxial with the pivot axis 26 is rotatably disposed between the pawls 74, 76. The cam 96 has a cam surface defined by first and second lobes 100, 102. Each one of the second lobes 102 includes an end portion 104. The cam surface is complimentary to the cam follower surface of the pawls 74, 76. In the locked condition, the first and second lobes 100, 102 are in contact with the first and second lobes 86, 88 on the pawls 74, 76 such that the cam 96 maintains the pawl teeth 92 in meshing engagement with the teeth 72 on the movable plate 30, best seen in FIG. 3. In the unlocked condition, the cam 96 is rotated in a clockwise direction (when viewed from FIGS. 6 and 7) about the pivot axis 26 from its position in the locked condition to a rotated position. With the cam 96 in the rotated position, the end portion 104 on each of the second lobes 102 is engaged with the release hook 90 on the corresponding pawl 74, 76, and the pawls 74, 76 are disposed radially inward such that the cam 96 maintains the pawl teeth 92 disengaged or spaced apart from the teeth 72 on the movable plate 30, best seen in FIG. 6.

The cam surface of the cam 96 also includes a pair of diametrically opposed spring tabs 105, which are positioned to engage with torsion springs 106 mounted on the posts 60 of the fixed plate 28. The springs 106 bias the cam 96 in a counterclockwise direction (when viewed from FIGS. 3 and 4) urging the pawls 74, 76 radially outward such that the pawl teeth 92 are normally in meshing engagement with the teeth 72 on the movable plate 30. Thus, the locking mechanism 32 is normally in the locked condition such that the fixed plate 28 and the movable plate 30 are coupled together, thereby preventing pivotal movement of the seat back 14.

Referring again to FIGS. 12 and 13, a primary shaft 108 extends axially through an aperture (not shown) in the seat cushion bracket 35, the first central bore 40 in the fixed plate 28, the third central bore 98 in the cam 96, the second central bore 64 in the movable plate 30, and an aperture (not shown) in the seat back bracket 36. The cam 96 is mounted on the primary shaft 108 such that it rotates therewith. A recliner handle 110, shown in FIG. 2, extends between a proximal end 112 and an opposite distal end 114. The proximal end 112 is fixedly secured to an end of the primary shaft 108 that protrudes through the seat cushion bracket 35. Lifting the distal end 114 of the recliner handle 110 causes the primary shaft 108 and therefore the cam 96 to rotate in the clockwise direction (when viewed from FIGS. 6 and 7), thereby actuating the locking mechanism 32 from the locked condition to the unlocked condition to allow pivotal adjustment of the seat back 14 between the plurality of reclined seating positions.

A memory function is provided by the memory mechanism 34. More specifically, after the seat back 14 is pivoted to the forwardly folded stowed position, the memory mechanism 34 ensures the seat back 14 is returned to a previously selected reclined seating position. In other words, the seat back 14 is returned to the reclined seating position that the seat back 14 was in prior to pivoting the seat back 14 to the forwardly folded stowed position. It is contemplated that only one of the disc recliners 24 is required to include the memory mechanism 34. The memory mechanism 34 includes a generally circular memory plate 116 and an actuating lever 118. The memory plate 116 is in the form of a disc with opposite first and second faces 120, 122, and a central elongated bore 124 extending axially therethrough. The memory plate 116 is adapted to fit between the fixed and movable plates 28, 30 such that the first face 120 is disposed adjacent to the pawls 74, 76 and the second face 122 is disposed adjacent to an inner face 126 of the movable plate 30. The central elongated bore 124 is coaxial with the pivot axis 26 such that the primary shaft 108 extends axially therethrough.

Figure 4:
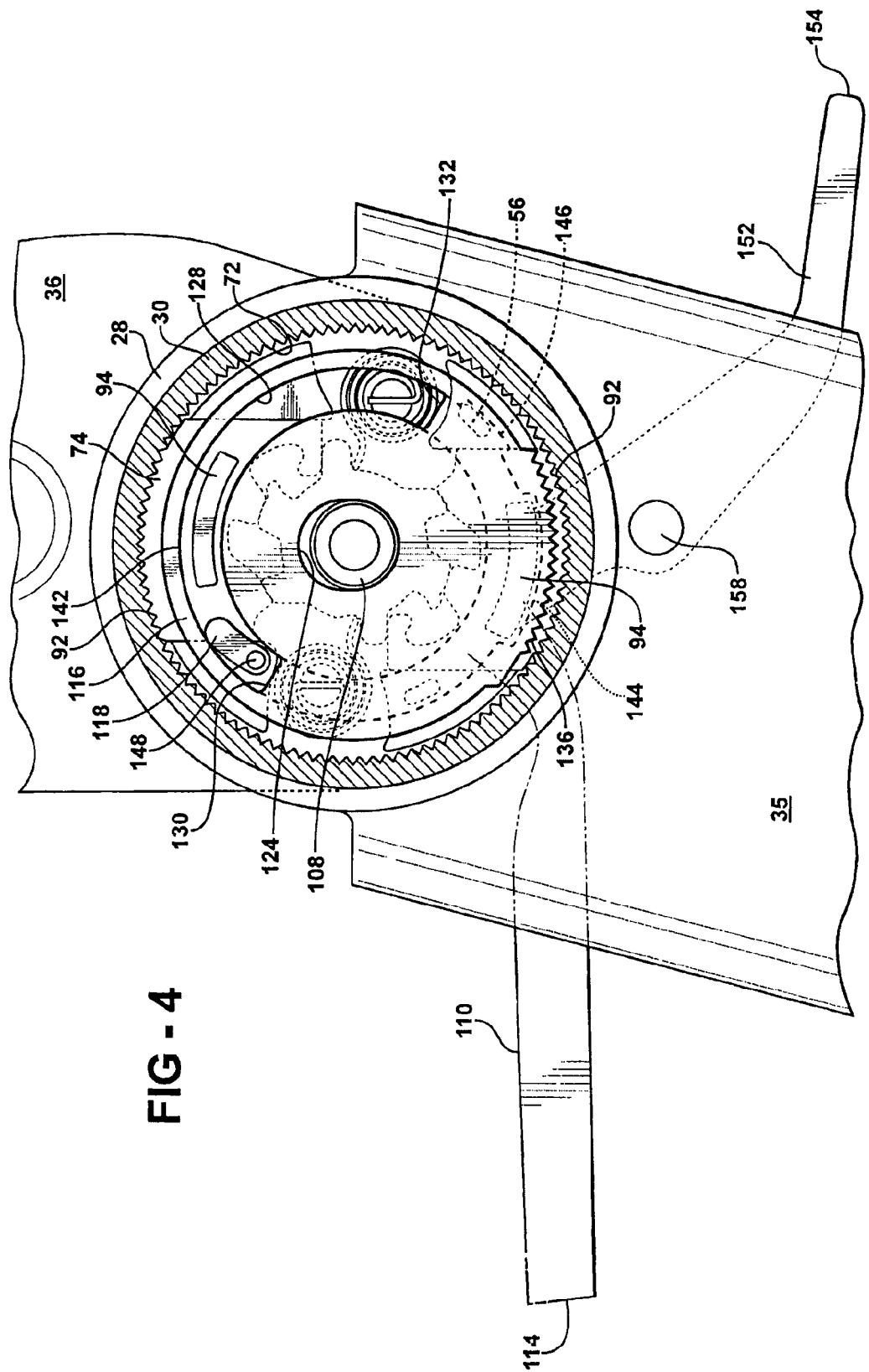
FIG. 4 is a fragmentary, partially cut-away, inner side view of the seat assembly illustrating the locking mechanism in the locked condition and the memory plate in a raised position.
Figure 15:
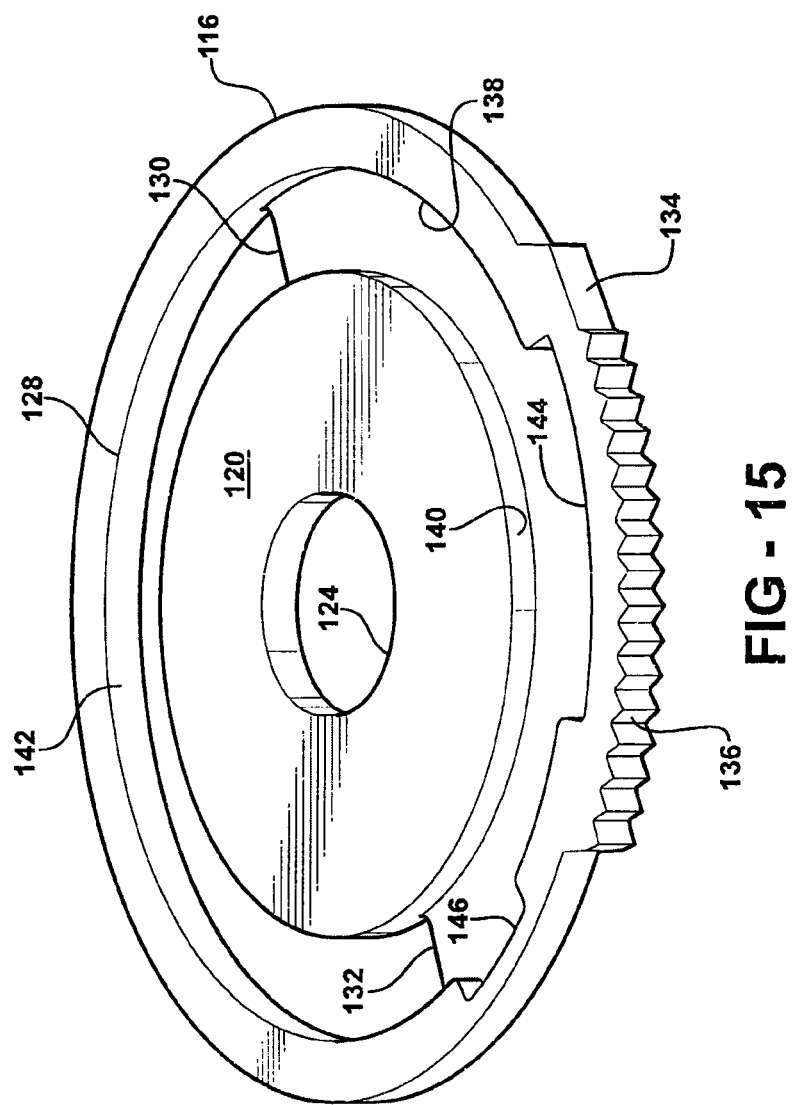
FIG. 15 is an outer perspective view of the memory plate of the disc recliner.
Figure 16:
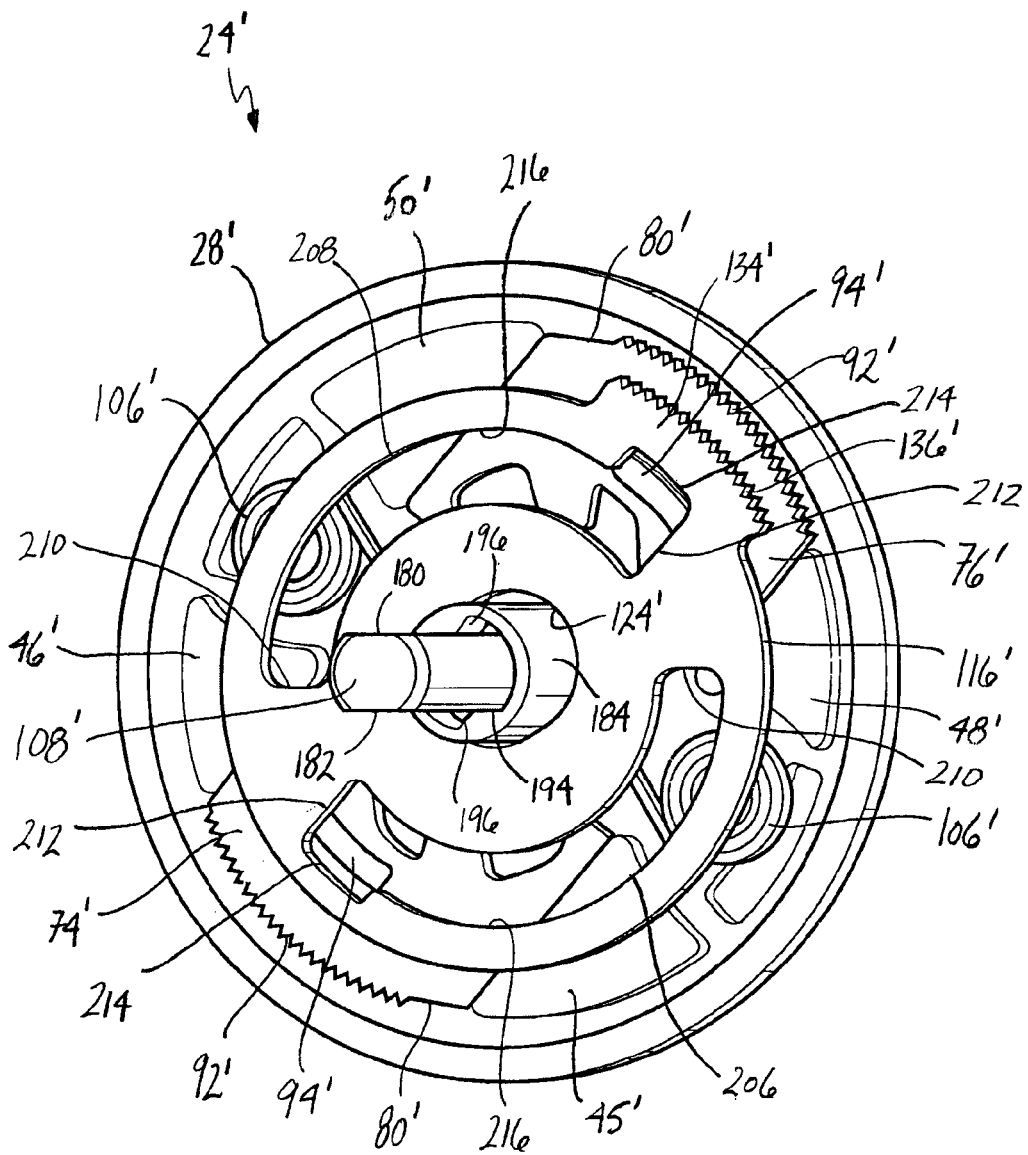
FIG. 16 is a fragmentary, outer perspective view of a disc recliner according to a second embodiment of the disc recliner.

Referring to FIG. 15, a slot 128 through the memory plate 116 extends arcuately between a first end 130 and a second end 132. The elongated tab 94 on the pawl 74 is disposed within the slot 128, as shown in FIG. 4. The memory plate 116 also includes a toothed segment 134 protruding radially outward from an outer circumference of the memory plate 116 on a side generally opposite to the slot 128. An outer edge of the toothed segment 134 is convex and includes a plurality of memory teeth 136 that are complementary to the teeth 72 on the movable plate 30. An arcuate channel 138 is formed in the first face 120 of the memory plate 116. The channel 138 has the same radius as the slot 128 and extends between the first and second ends 130, 132 thereof. The slot 128 and the channel 138 are disposed radially inward relative to the outer circumference of the memory plate 116 and define an inner edge 140 and an opposite outer edge 142. The elongated tab 94 on the pawl 76 is disposed within the channel 138, as shown in FIG. 4. The channel 138 includes a main recessed portion 144 and a secondary recessed portion 146. The main recessed portion 144 extends radially outward along the toothed segment 134 and is adapted to receive therein the elongated tab 94 on the pawl 76, as is described below. The secondary recessed portion 146 extends radially outward and is disposed between the main recessed portion 144 and the second end 132 of the slot 128. The secondary recessed portion 146 is adapted to receive therein the small tab 56 on the third embossment 48, as is described below.

Figure 9:
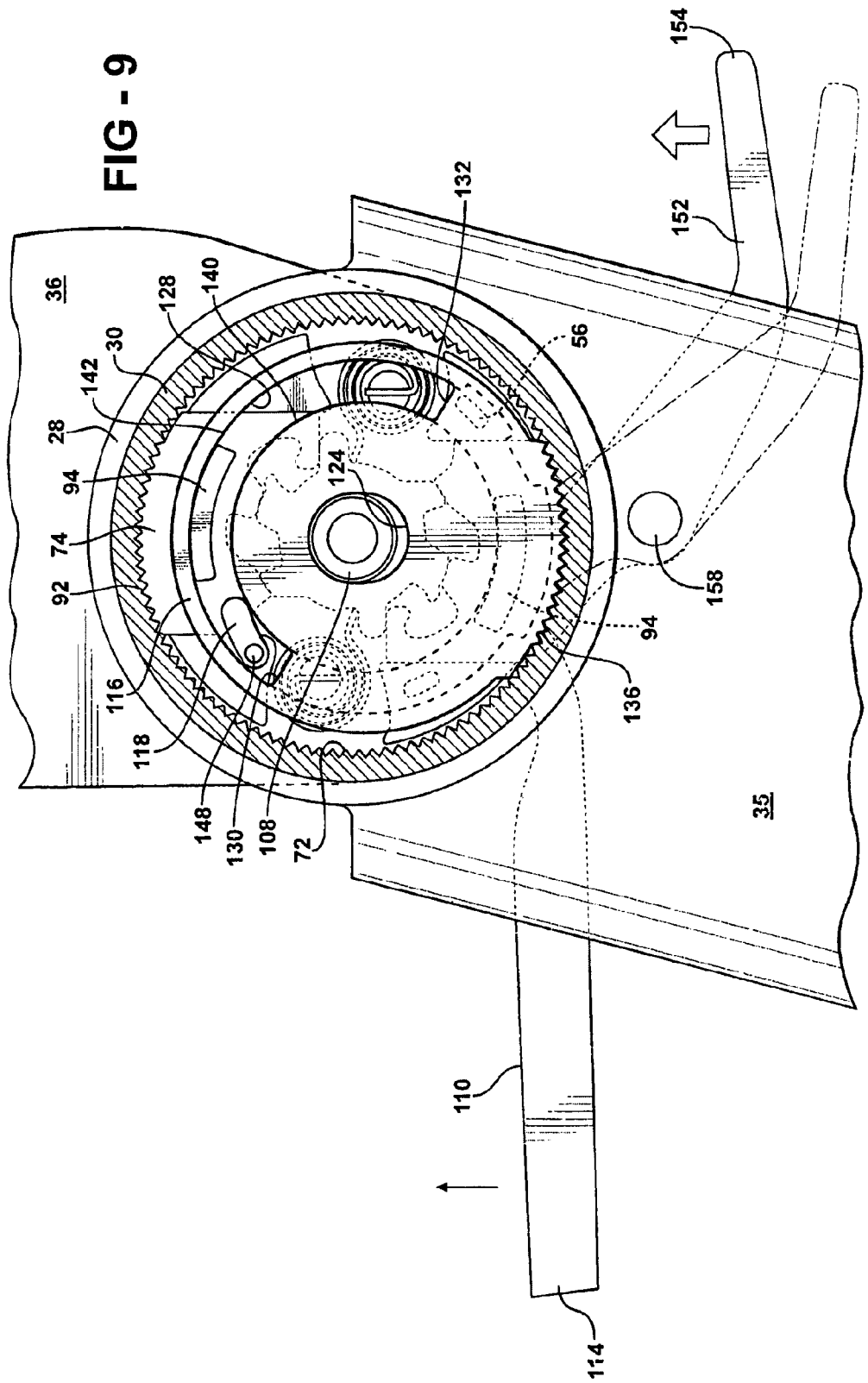
FIG. 9 is a fragmentary, partially cut-away, inner side view of the seat assembly illustrating initial actuation of the fold flat handle, the locking mechanism in the locked condition and the memory plate in the lowered position.

The actuating lever 118 moves the memory plate 116 between a raised position wherein the memory teeth 136 are disengaged with the teeth 72 on the movable plate 30, shown in FIG. 4, and a lowered position wherein the memory teeth 136 are meshingly engaged with the teeth 72 on the movable plate 30, shown in FIG. 9. Referring to FIG. 12, the actuating lever 118 is mounted on a secondary shaft 148 extending through the secondary bore 58 in the fixed plate 28. More specifically, the actuating lever 118 is fixedly secured to one end of the shaft 148 and is disposed within the slot 128 in the memory plate 116. An opposite end of the shaft 148 protrudes through an aperture 149 in the seat cushion bracket 35 and includes a slot 150 formed therein, best seen in FIG. 2. The purpose of the slot 150 is described below. The secondary shaft 148 is biased in the counterclockwise direction (when viewed from FIG. 4) such that the actuating lever 118 engages the outer edge 142 of the slot 128 to maintain the memory plate 116 in the raised position, as shown in FIG. 4. In the raised position, the elongated tab 94 on the pawl 76 is disposed in the main recessed portion 144 and the small tab 56 on the third embossment 48 is disposed in the secondary recessed portion 146, thereby preventing the memory plate 116 from rotating about the pivot axis 26. Additionally, when the memory plate 116 is in the raised position and the locking mechanism 32 is in the locked condition, it is noted that the elongated tab 94 on the pawl 74 is disposed generally between the inner and outer edges 140, 142 of the slot 128, as shown in FIG. 4. This allows the memory plate 116 to be moved from the raised position to the lowered position prior to the locking mechanism 32 being actuated to the unlocked condition.

When the secondary shaft 148 is rotated in the clockwise direction (when viewed from FIG. 9) the actuating lever 118 engages the inner edge 140 of the slot 128 and urges the memory plate 116 into the lowered position, as shown in FIG. 9. In the lowered position, the elongated tab 94 on the pawl 76 and the small tab 56 on the third embossment 48 are both disposed in the channel 138, thereby allowing the memory plate 116 to rotate about the pivot axis 26. Because the memory teeth 136 are engaged with the teeth 72 on the movable plate 30 when the memory plate 116 is in the lowered position the memory plate 116 will rotate with the movable plate 30.

Figure 2:
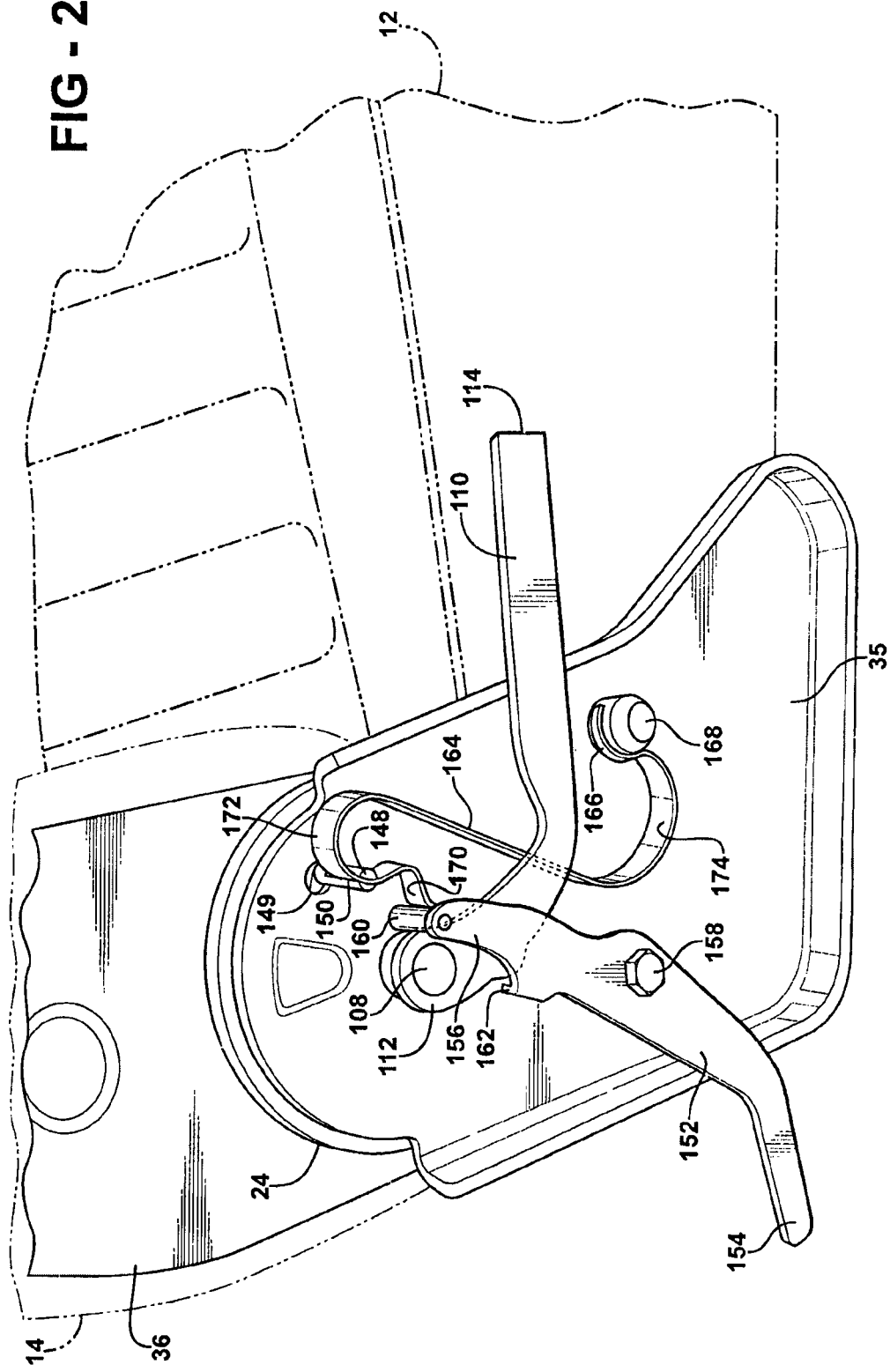
FIG. 2 is a fragmentary, outer side perspective view of the seat assembly with a seat back in one of a plurality of reclined seating positions and the disc recliner including a recliner handle and a fold flat handle.

Referring to FIGS. 1 and 2, a fold flat handle 152 extends between a handle end 154 and an opposite lever end 156. The fold flat handle 152 is pivotally coupled to the seat cushion bracket 35 between the handle and lever ends 154, 156 at pivot 158. First and second tabs 160, 162 extend perpendicularly to the fold flat handle 152 and generally parallel to the pivot axis 26. The first and second tabs 160, 162 are spaced apart and are disposed on opposite sides of the distal end 112 of the recliner handle 110. More particularly, the first tab 160 is disposed at the lever end 156 of the fold flat handle 152 and is adapted for engaging a reverse S-shaped primary spring 164. The second tab 162 is disposed between the first tab 160 and the pivot 158 and is adapted for engaging the distal end 112 of the recliner handle 110.

The primary spring 164 extends between a first end 166, which is adapted to engage a post 168 that is fixedly secured to the seat cushion bracket 35, and an opposite second end 170. The primary spring 164 extends through the slot 150 in the secondary shaft 148 and is configured to define a first or upper portion 172 and a second or lower portion 174. The upper portion 172 of the primary spring 164 is shorter and stiffer than the lower portion 174 such that the upper portion 172 has a higher spring rate. The lower portion 174 of the primary spring 164 biases the actuating lever 118 in the clockwise direction (when viewed from FIG. 2) or counterclockwise direction (when viewed from FIG. 4), thereby maintaining the memory plate 116 in the raised position.

Figure 8:
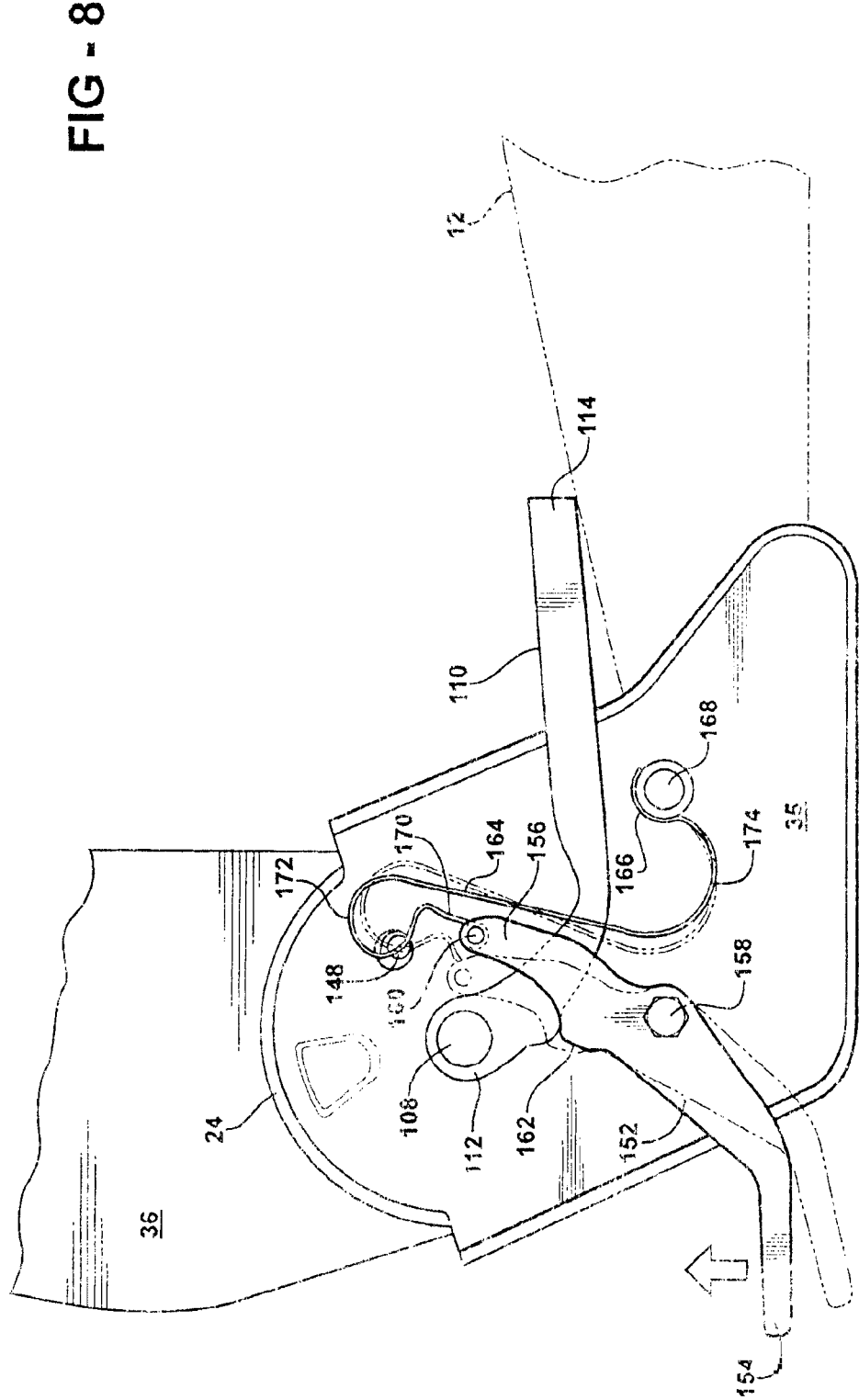
FIG. 8 is a fragmentary, outer side view of the seat assembly illustrating initial actuation of the fold flat handle for moving the memory plate to a lowered position.

Lifting the handle end 154 of the fold flat handle 152 causes the first tab 160 to engage the second end 170 of the primary spring 164 to overcome the spring force of the lower portion 174 that maintains the memory plate 116 in the raised position. The first tab 160 then deflects the upper portion 172 of the primary spring 164, which causes the secondary shaft 148 to rotate in the counterclockwise direction (when viewed from FIG. 8). Continued lifting of the handle end 154 of the fold flat handle 152 causes the second tab 162 to engage the distal end 112 of the recliner handle 110, which causes the recliner handle 110 to pivot in the counterclockwise direction to rotate the primary shaft 108 in the counterclockwise direction (when viewed from FIG. 10). It is contemplated that a torsion spring (not shown) disposed about the pivot 158 or an extension spring (not shown) extending between the fold flat handle 152 and the seat cushion bracket 35 could be used for biasing the fold flat handle 152 back to its initial position after lifting the handle end 154.

Figure 5:
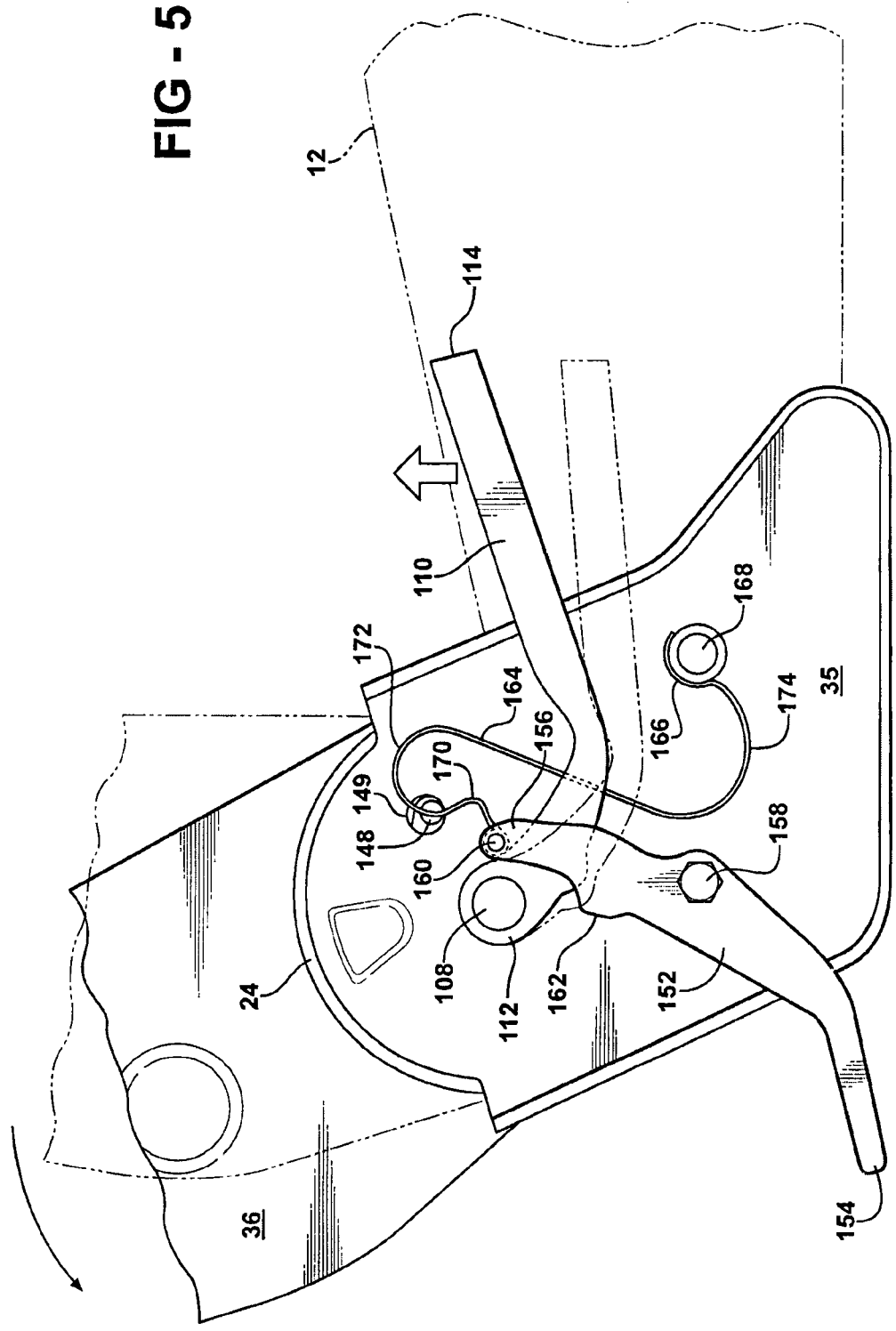
FIG. 5 is a fragmentary, outer side view of the seat assembly illustrating actuation of the recliner handle for pivotally adjusting the seat back.
Figure 6:
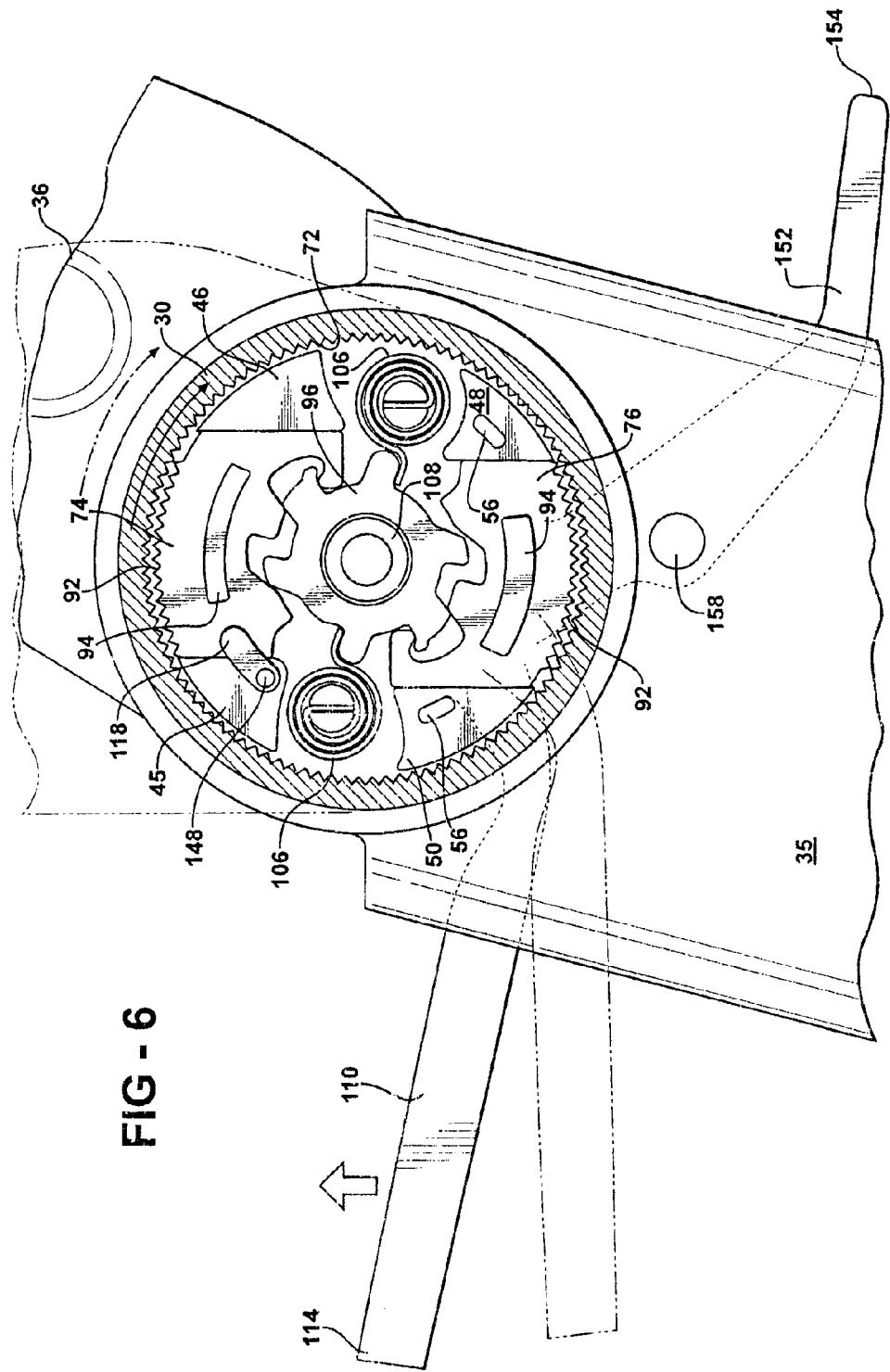
FIG. 6 is a fragmentary, partially cut-away, inner side view of the seat assembly illustrating actuation of the recliner handle, the locking mechanism in an unlocked condition and the memory plate removed.
Figure 7:
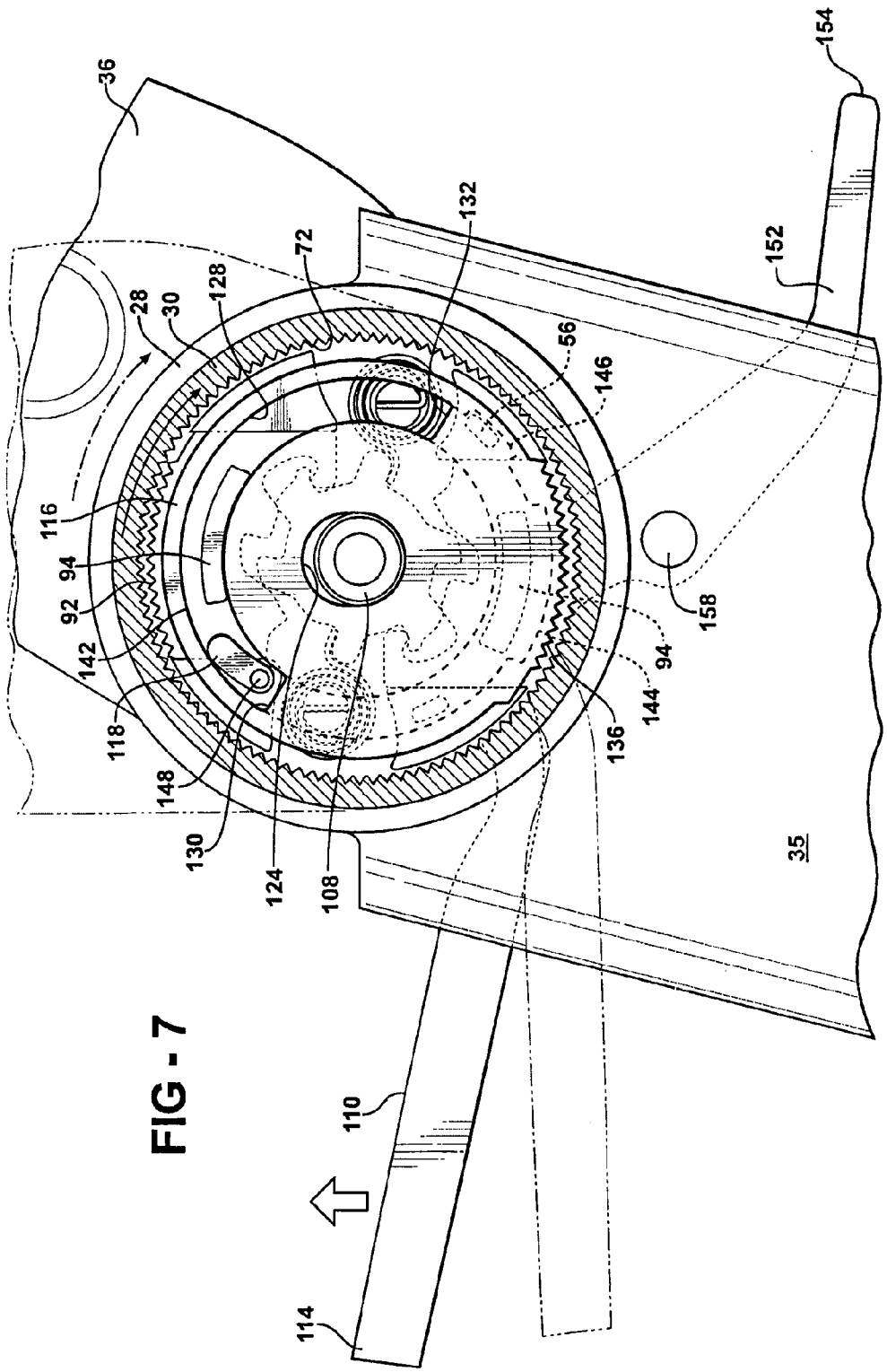
FIG. 7 is a fragmentary, partially cut-away, inner side view of the seat assembly illustrating actuation of the recliner handle, the locking mechanism in the unlocked condition and the memory plate in the raised position.

In operation, the seat back 14 is normally in one of the plurality of reclined seating positions, as shown in FIGS. 1 through 4. When it is desired to adjust the reclined seating position of the seat back 14, the distal end 114 of the recliner handle 110 is lifted thereby rotating the primary shaft 108 and cam 96 in the clockwise direction (when viewed from FIGS. 6 and 7). Rotating the cam 96 in the clockwise direction causes the end portion 104 on each of the second lobes 102 to engage the release hook 90 on one of the pawls 74, 76 to urge the pawls 74, 76 radially inward such that the pawl teeth 92 are disengaged with the teeth 72 on the movable plate 30, as shown in FIGS. 6 and 7. The locking mechanism 32 is now in the unlocked condition and the movable plate 30 is free to rotate relative to the fixed plate 28. The occupant is now able to adjust the seat back 14 to any one of the plurality of reclined seating positions, as shown in FIGS. 5 through 7.

Figure 3:
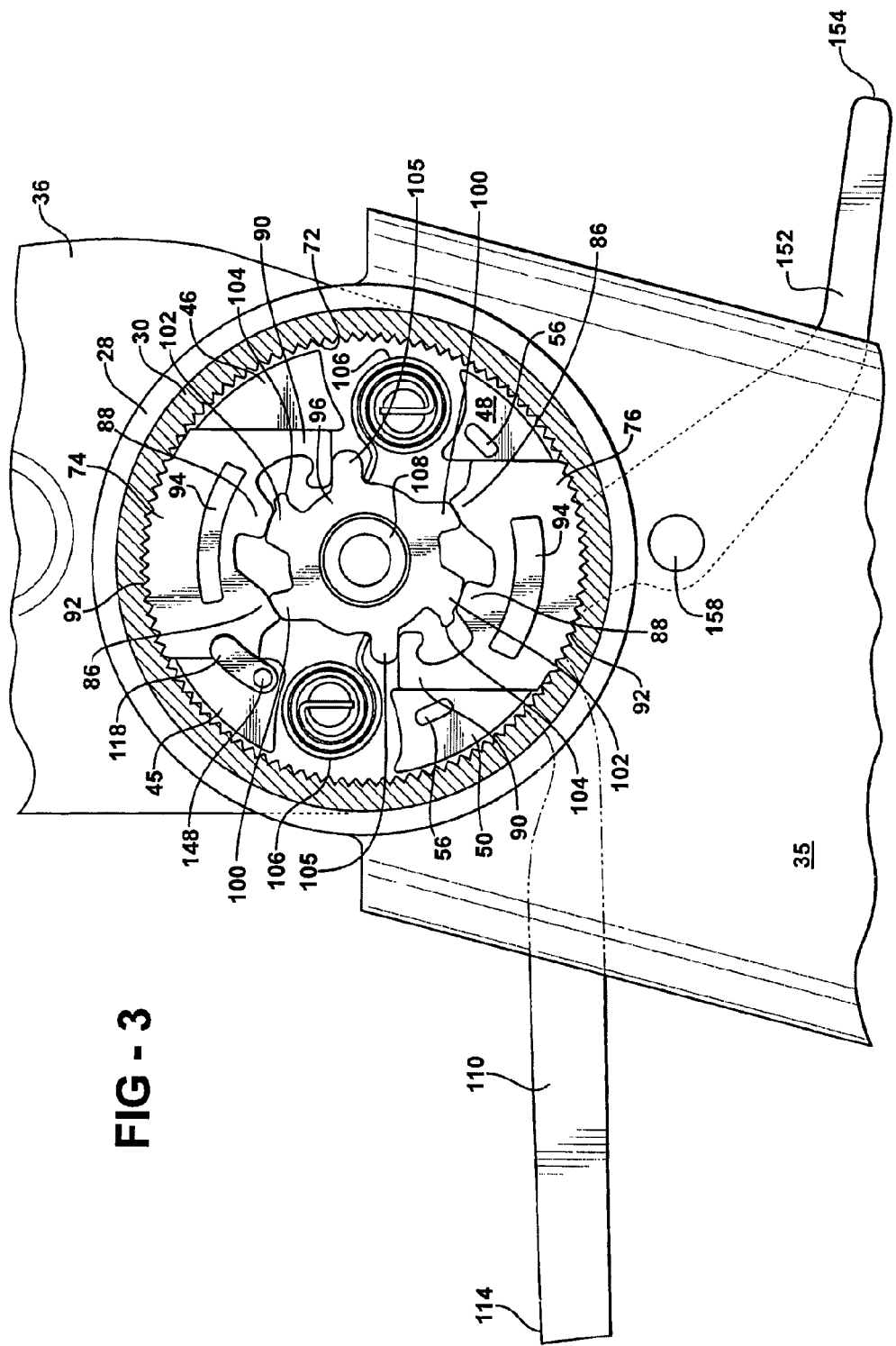
FIG. 3 is a fragmentary, partially cut-away, inner side view of the seat assembly illustrating a locking mechanism in a locked condition and a memory plate removed.

It should be noted that during adjustment of the seat back 14 between the plurality of reclined seating positions, the lower portion 174 of the primary spring 164 continues to bias the actuating lever 118 in the counterclockwise direction (when viewed from FIG. 7) to maintain the memory plate 116 in the raised position, as shown in FIG. 7. In the raised position, the memory teeth 136 are disengaged with the teeth 72 on the movable plate 30 and therefore the memory plate 116 does not rotate with the movable plate 30 as the seat back 14 is pivotally adjusted. Once the seat back 14 is adjusted to the desired one of the plurality of reclined seating positions, the distal end 114 of the recliner handle 110 is released and the torsion springs 106 bias the cam 96 to rotate in the counterclockwise direction (when viewed from FIG. 4). Rotating the cam 96 in the counterclockwise direction causes the first and second lobes 100, 102 to abut the first and second lobes 86, 88 on the corresponding pawls 74, 76 and urges the pawls 74, 76 radially outward such that the pawl teeth 92 are engaged with the teeth 72 on the movable plate 30, as shown in FIGS. 3 and 4. Thus, the locking mechanism 32 is now in the locked condition preventing further pivotal movement of the seat back 14.

Figure 10:
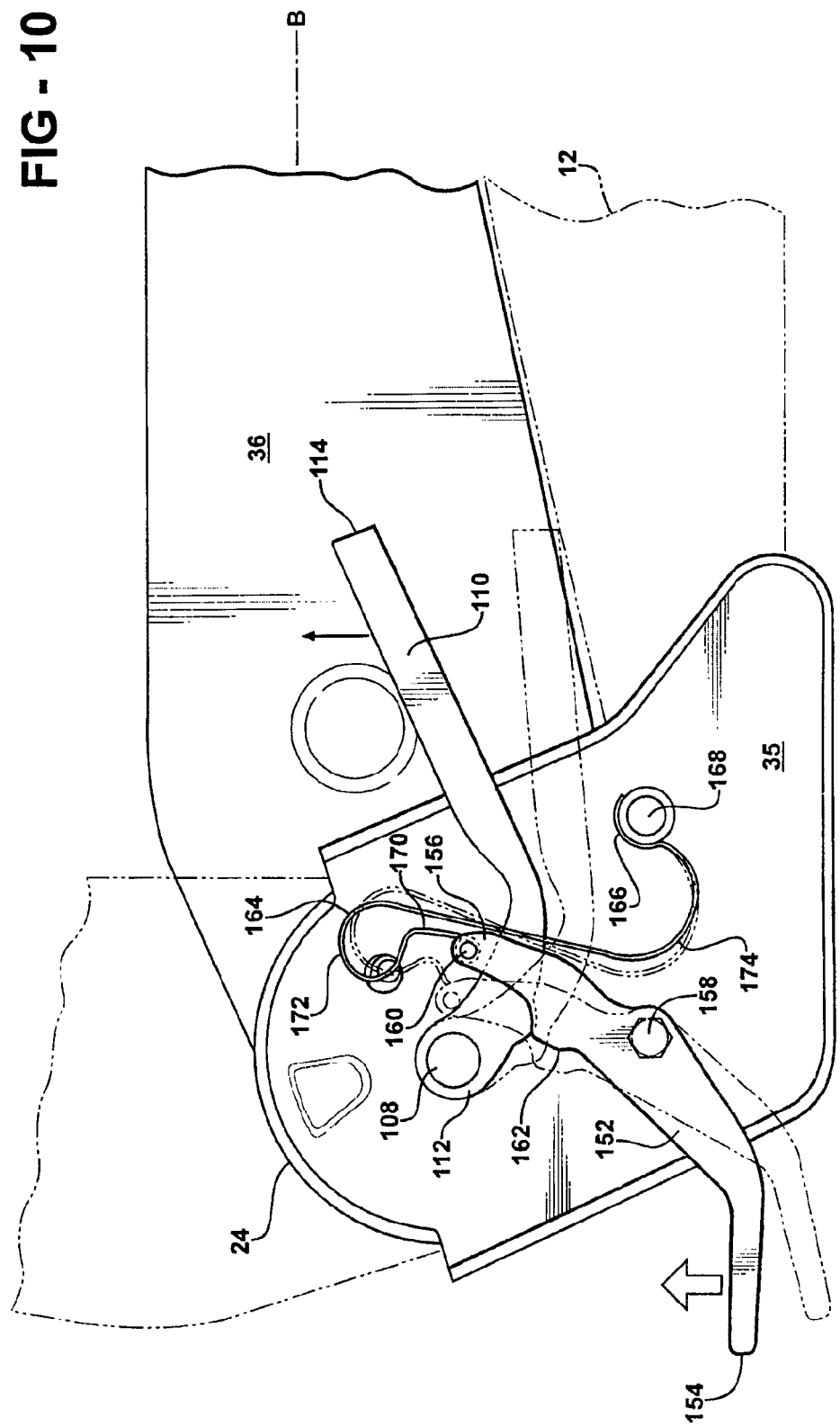
FIG. 10 is a fragmentary, outer side view of the seat assembly illustrating further actuation of the fold flat handle for folding the seat back forward to a stowed position.
Figure 11:
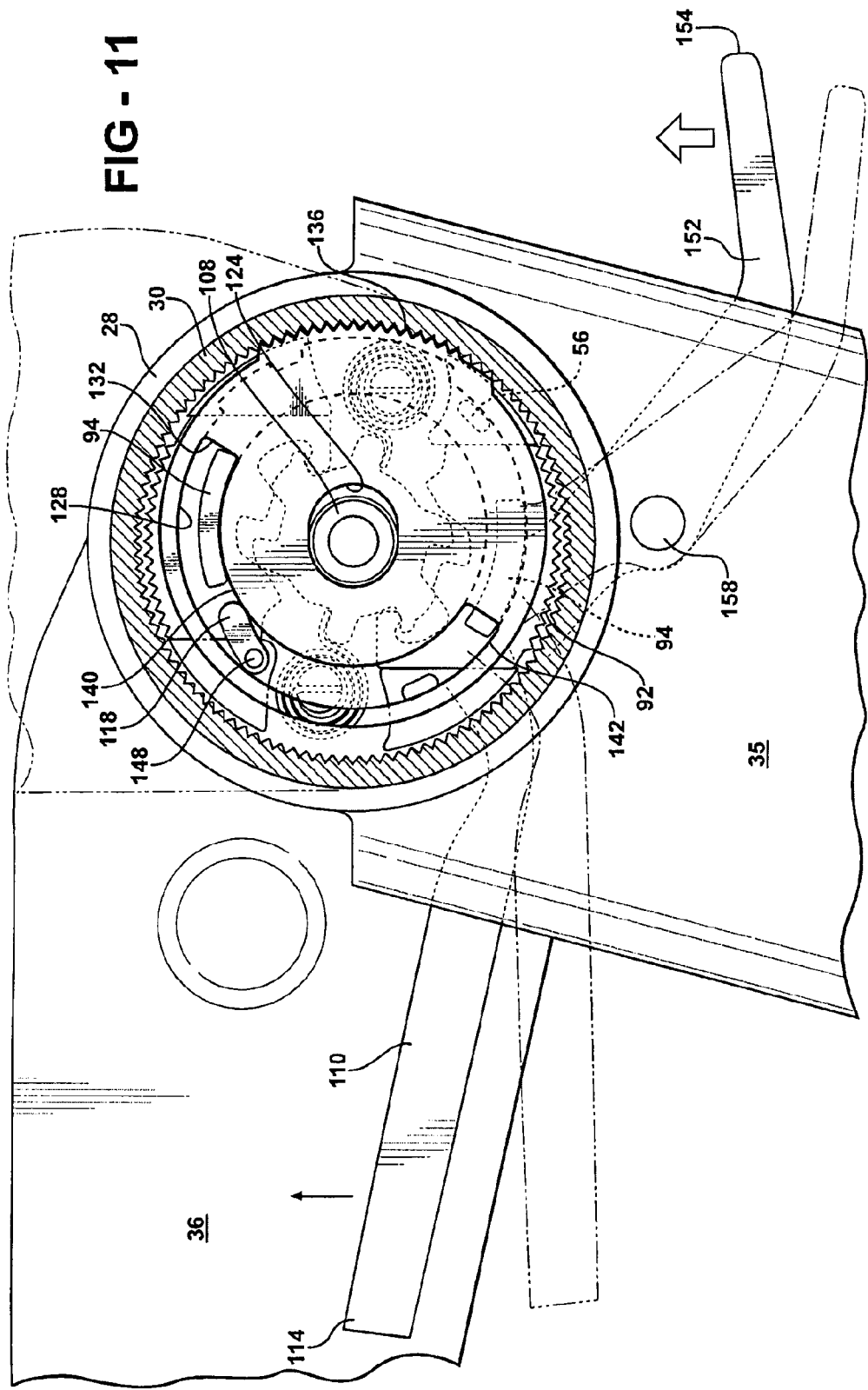
FIG. 11 is a fragmentary, partially cut-away, inner side view of the seat assembly illustrating further actuation of the fold flat handle, the locking mechanism in the unlocked condition and the memory plate in the lowered position.

When it is desired to move the seat back 14 from a previously selected reclined seating position to the forwardly folded stowed position, as shown in FIGS. 10 and 11, the handle end 154 of the fold flat handle 152 is lifted thereby rotating the fold flat handle 152 in the clockwise direction (when viewed from FIG. 8) about the pivot 158. As the fold flat handle 152 begins to rotate in the clockwise direction, the first tab 160 engages the second end 170 of the primary spring 164 to first overcome the spring force of the lower portion 174 of the primary spring 164 that maintains the memory plate 116 in the raised position. The fold flat handle 152 then deflects the upper portion 172 of the primary spring 164 causing the secondary shaft 148 to rotate in the counterclockwise direction (when viewed from FIG. 8). As the secondary shaft 148 rotates in the counterclockwise direction (when viewed from FIG. 8) or the clockwise direction (when viewed from FIG. 9), the actuating lever 118 engages the inner edge 140 of the slot 128 and urges the memory plate 116 into the lowered position such that the memory teeth 136 are engaged with the teeth 72 on the movable plate 30, as shown in FIG. 9. As the fold flat handle 152 continues to rotate in the clockwise direction, the second tab 162 engages the distal end 112 of the recliner handle 110 and causes the recliner handle 110 to pivot in the counterclockwise direction (when viewed from FIG. 10) thereby rotating the primary shaft 108 and cam 96 in the clockwise direction (when viewed from FIG. 11). Rotating the cam 96 in the clockwise direction causes the end portion 104 on each of the second lobes 102 to engage the release hook 90 on one of the pawls 74, 76 to urge the pawls 74, 76 radially inward such that the pawl teeth 92 are disengaged with the teeth 72 on the movable plate 30, as shown in FIG. 11. The locking mechanism 32 is now in the unlocked condition, the memory plate 116 is engaged with the movable plate 30, and the movable plate 30 is free to rotate relative to the fixed plate 28. The occupant is now able to move the seat back 14 to the forwardly folded stowed position. It is appreciated that the seat back 14 may be biased toward the forwardly folded stowed position.

It should be noted that once the seat back 14 begins to pivot from the previously selected reclined seating position toward the stowed position, the fold flat handle 152 may be released without the locking mechanism 32 returning to the locked condition. More specifically, as the movable plate 30 begins to rotate with the pivotal movement of the seat back 14, the memory plate 116 being engaged with the movable plate 30 also rotates. The elongated tab 94 on the pawl 76 is disposed in the channel 138 of the memory plate 116 and engages the outer edge 142 of the channel 138, which prevents the pawl 76 from moving radially outward under the bias of the torsion springs 106 transmitted through the cam 96. Since the pawl 76 is prevented from moving radially outward, the pawl 74 is also prevented from moving radially outward. Thus, the channel 138 maintains the pawl teeth 92 disengaged with the teeth 72 on the movable plate 30 as the seat back 14 pivots toward the stowed position. Upon releasing the fold flat handle 152, the torsion spring or extension spring, which are contemplated but not shown, will bias the fold flat handle 152 back to its initial position. With the fold flat handle 152 in its initial position and the memory plate 116 in the lowered position, the second end 170 of the primary spring 164 is held apart from the first tab 160 of the fold flat handle 152. Thus, without the torsion spring or extension spring the fold flat handle 152 would be free to move between its initial position and a position abutting the second end 170 of the primary spring 164. As such, the torsion spring or extension spring will act as an anti-rattle feature to prevent the fold flat handle 152 from causing any unwanted rattling.

When it is desired to return the seat back 14 to the previously selected reclined seating position, the seat back 14 is simply pivoted upward about the pivot axis 26. As the seat back 14 is pivoted upward, the memory plate 116 is engaged with the movable plate 30 and the elongated tab 94 on the pawl 76 engages the outer edge 142 of the channel 138 which prevents the pawl 76 from moving radially outward under the bias of the torsion springs 106 transmitted through the cam 96. Since the pawl 76 is prevented from moving radially outward, the pawl 74 is also prevented from moving radially outward. The memory plate 116 continues to rotate with the movable plate 30 until the seat back 14 is in the previously selected reclined seating position. With the seat back 14 in the previously selected reclined seating position, the elongated tab 94 is aligned with the main recessed portion 144 and the small tab 56 on the third embossment 48 is aligned with the secondary recessed portion 146, thereby allowing the pawls 74, 76 to move radially outward such that the pawl teeth 92 are engaged with the teeth 72 on the movable plate 30, as shown in FIG. 3. At the same time, the lower portion 174 of the primary spring 164 biases the actuating lever 118 in the counterclockwise direction (when viewed from FIG. 4), thereby urging the memory plate 116 into the raised position. The seat back 14 is now in the previously reclined seating position and the locking mechanism 32 is in the locked condition.

Referring to FIGS. 16 through 24, a second embodiment of a disc recliner 24' is shown, wherein like primed reference numerals represent similar elements as those described above. The second embodiment of the disc recliner 24' generally includes a fixed plate 28', a movable plate 30', a locking mechanism 32', and a memory mechanism 34'. As in the first embodiment, it is contemplated that only one of the disc recliners 24' is required to include the memory mechanism 34'.

Figure 17:
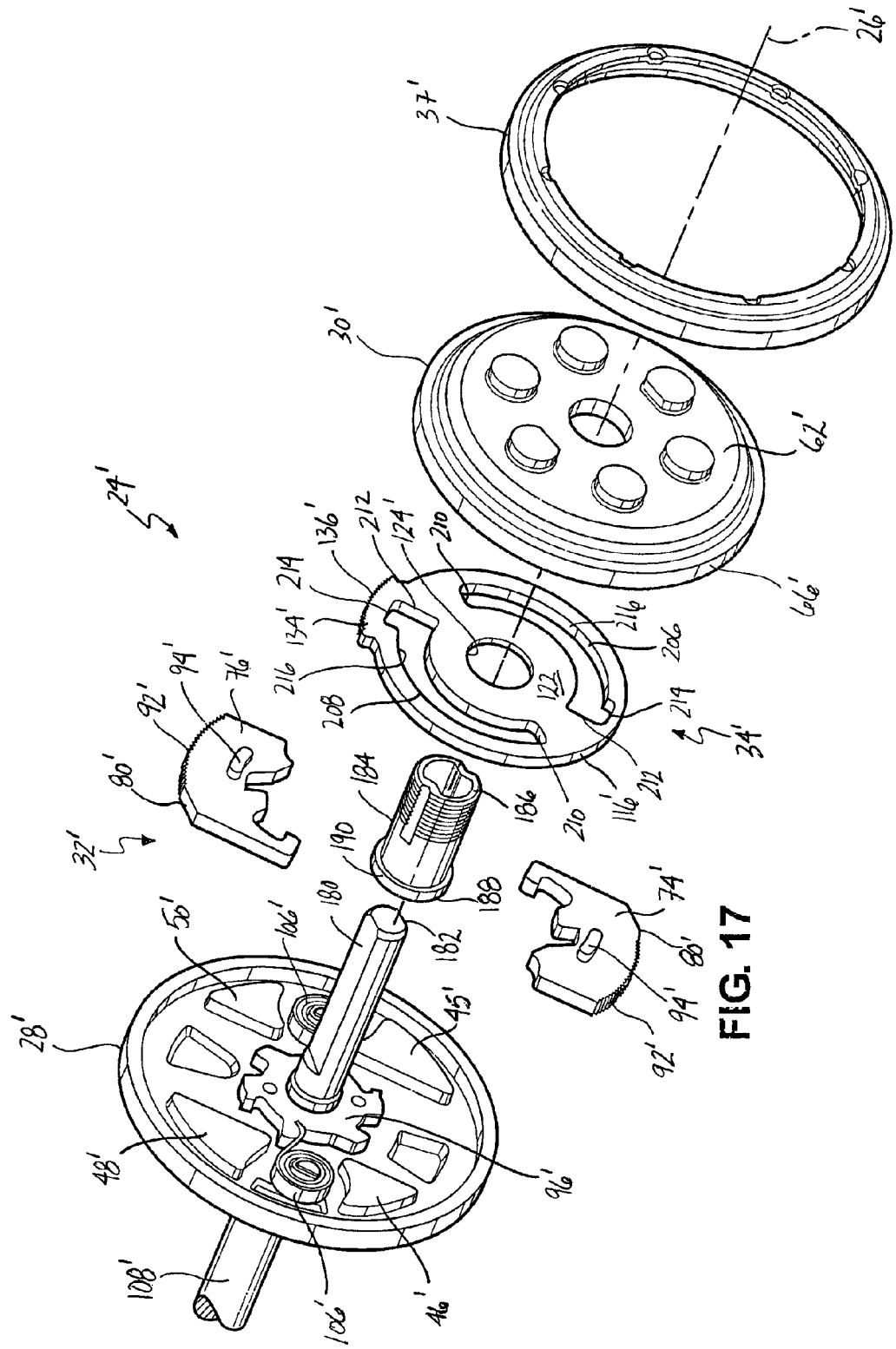
FIG. 17 is an exploded, outer perspective view of the second embodiment of the disc recliner.

Referring to FIG. 17, as in the first embodiment, the fixed plate 28' includes a first embossment 45', a second embossment 46', a third embossment 48', and a fourth embossment 50'. In the second embodiment, however, the third and fourth embossments 48', 50' do not include the small arcuate tab 56 that is disclosed in the first embodiment. Additionally, the first embossment 45' does not include the secondary bore 58.

Figure 18:
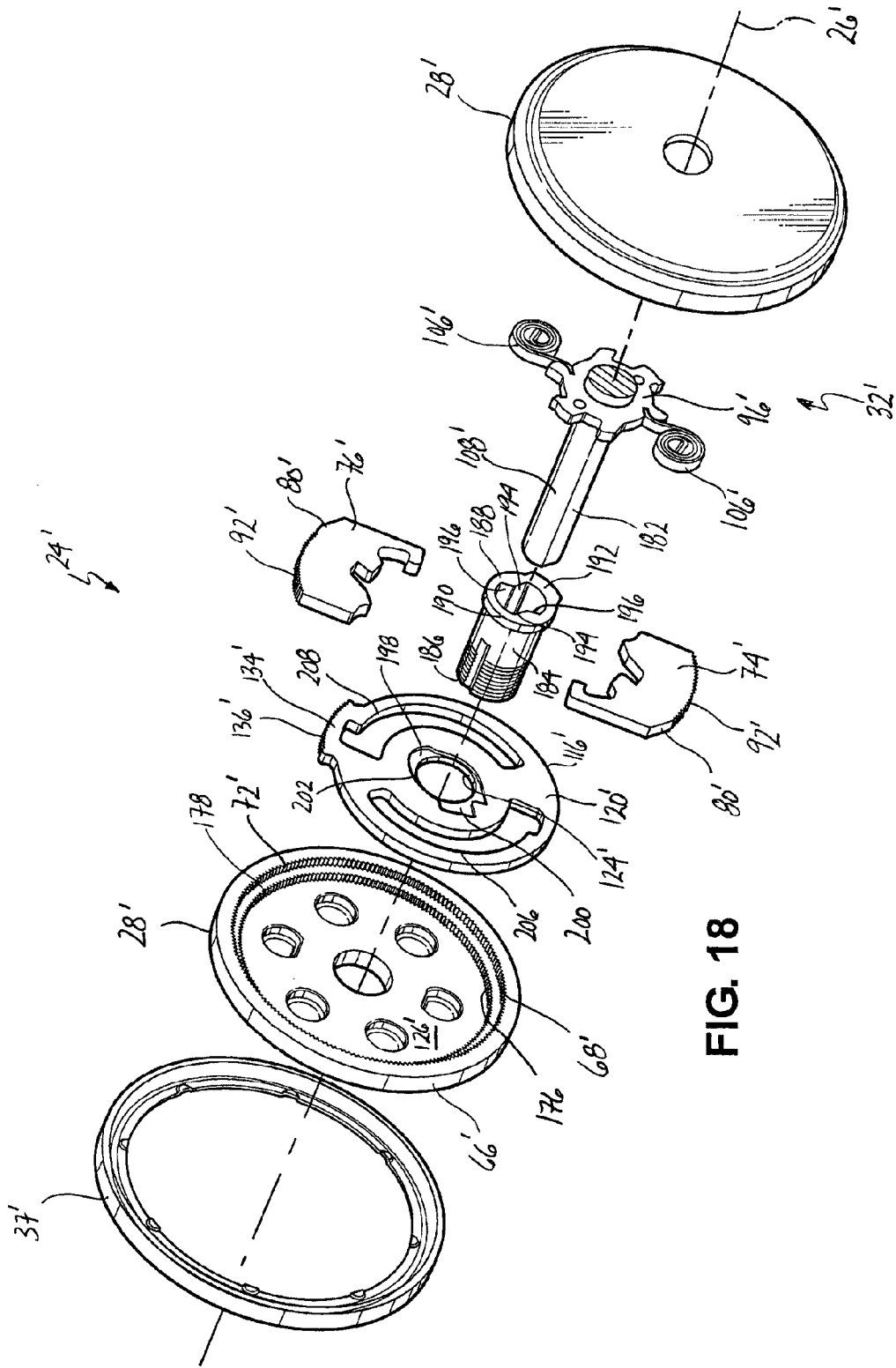
FIG. 18 is an exploded, inner perspective view of the second embodiment of the disc recliner.

Referring to FIG. 18, as in the first embodiment, the movable plate 30' includes an end wall 62' and an axially extending wall or flange 66' that is disposed circumferentially around the movable plate 30'. In the second embodiment, however, the flange 66' defines a stepped inner surface including a first inner surface 68' and a second inner surface 176 disposed between the first inner surface 68' and an inner face 126' of the end wall 62'. The diameter of the second inner surface 176 is smaller than the diameter of the first inner surface 68'. The first inner surface 68' includes a plurality of primary teeth 72' disposed therearound and the second inner surface 176 includes a plurality of secondary teeth 178 disposed therearound.

Figure 19:
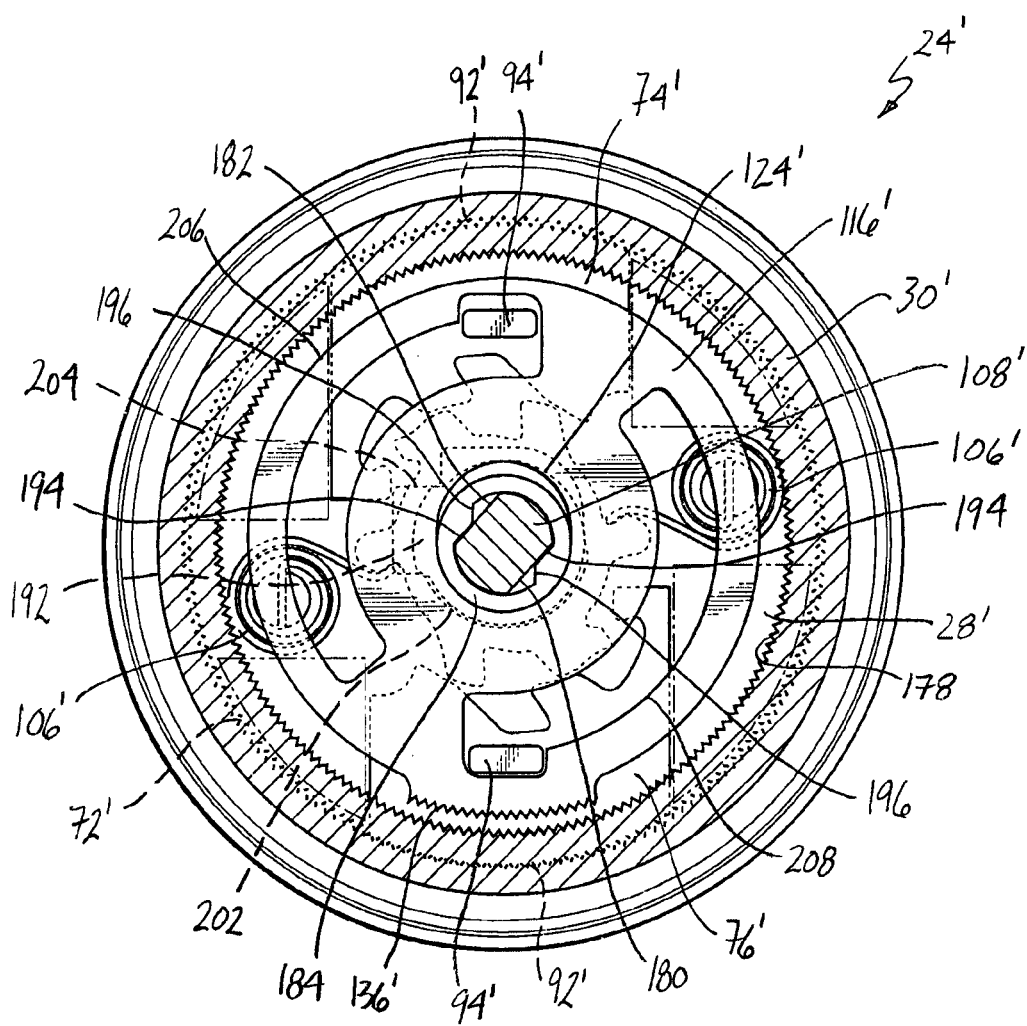
FIG. 19 is a partially cut-away, side view of the second embodiment of the disc recliner illustrating a locking mechanism in a locked condition and a memory plate in a raised position when a seat back is in a reclined seating position.
Figure 20:
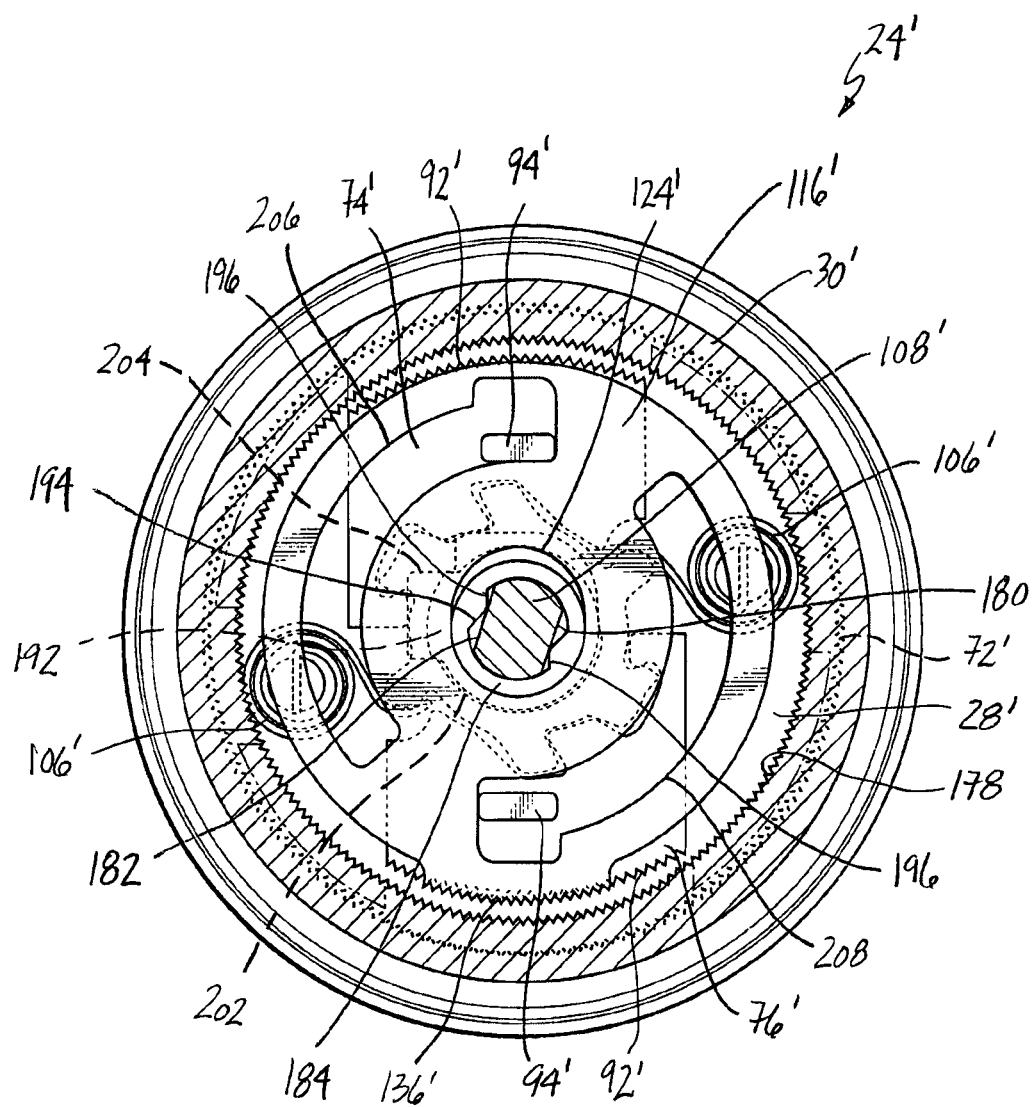
FIG. 20 is a partially cut-away, side view of the second embodiment of the disc recliner illustrating the locking mechanism in an unlocked condition and the memory plate in the raised position to allow pivotal adjustment of the seat back.

The locking mechanism 32' includes a pair of toothed pawls 74', 76'. Each one of the pawls 74', 76' includes an outer peripheral edge 80' that is generally convex and has a plurality of pawl teeth 92' that are complementary to the primary teeth 72' on the movable plate 30'. When the locking mechanism 32' is in a locked condition, a cam 96' maintains the pawl teeth 92' in meshing engagement with the primary teeth 72' on the movable plate 30', as shown in FIG. 19. When the locking mechanism 32' is in an unlocked condition, the cam 96' is rotated in a counterclockwise direction (when viewed from FIG. 20) about a pivot axis 26' from its position in the locked condition to a rotated position. In the rotated position the pawls 74', 76' are disposed radially inward such that the cam 96' maintains the pawl teeth 92' disengaged with or spaced apart from the primary teeth 72' on the movable plate 30', as shown in FIG. 20. A pair of torsion springs 106' bias the cam 96' in a clockwise direction (when viewed from FIG. 19) urging the pawls 74', 76' radially outward such that the pawl teeth 92' are normally in meshing engagement with the primary teeth 72' on the movable plate 30'. Thus, the locking mechanism 32' is normally in the locked condition such that the fixed plate 28' and the movable plate 30' are coupled together, thereby preventing pivotal movement of a seat back 14'.

Referring again to FIG. 17, a primary shaft 108' that is coaxial with the pivot axis 26' extends axially through the fixed plate 28', the cam 96', and the movable plate 30'. The cam 96' is mounted on the primary shaft 108' such that it rotates therewith. As in the first embodiment, a recliner handle 110' is fixedly secured to the primary shaft 108'. Lifting a distal end 114' of the recliner handle 110' causes the primary shaft 108' and therefore the cam 96' to rotate in the counterclockwise direction (when viewed from FIG. 19), thereby actuating the locking mechanism 32' from the locked condition to the unlocked condition to allow pivotal adjustment of the seat back 14' between a plurality of reclined seating positions. A portion of the primary shaft 108' extending laterally from the cam 96' includes a first flat surface 180 and a second flat surface 182, the purpose of which will become apparent below. In the embodiment shown, the first flat surface 180 is disposed on one side of the primary shaft 108' and the second flat surface 182 is disposed on an opposite side of the primary shaft 108'.

The memory mechanism 34' includes a generally circular memory plate 116' and a memory plate release post 184. The release post 184 is generally shaped as an elongated tube extending between a first end 186 and a second end 188, the second end 188 having a collar 190 extending circumferentially therearound. A key 192 protrudes radially outward from an outer circumference of the collar 190, best seen in FIG. 18. The primary shaft 108' extends axially through the release post 184. The interior of the release post 184 is configured to allow rotation of the primary shaft 108' independently of the release post 184 and to also allow rotation of the primary shaft 108' in response to rotation of the release post 184. More specifically, the interior of the release post 184 includes a pair of spaced apart and opposing primary surfaces 194 and a pair of spaced apart and opposing secondary surfaces 196. The primary surfaces 194 are disposed at an angle relative to the secondary surfaces 196. When the locking mechanism 32' is in the locked condition, the primary shaft 108' is oriented such that the first and second flats 180, 182 abut the primary surfaces 194 of the release post 184, as shown in FIG. 19. Lifting the distal end 114' of the recliner handle 110' causes the primary shaft 108' and therefore the cam 96' to rotate in the counterclockwise direction, thereby actuating the locking mechanism 32' from the locked condition to the unlocked condition, as described above. As the primary shaft 108' rotates in the counterclockwise direction the first flat surface 180 and the second flat surface 182 move away from the primary surfaces 194 of the release post 184 and toward the secondary surfaces 196 of the release post 184 such that the primary shaft 108' rotates without rotating the release post 184.

The memory plate 116' is in the form of a disc with opposite first and second faces 120', 122', and a central elongated bore 124' extending axially therethrough. The memory plate 116' is adapted to fit between the fixed plate 28' and the movable plate 30' such that the first face 120' is disposed adjacent to the pawls 74', 76' and the second face 122' is disposed adjacent to the inner face 126' of the movable plate 30'. The central elongated bore 124' is coaxial with the pivot axis 26' and the release post 184 extends axially therethrough. The release post 184 is adapted for moving the memory plate 116' between a raised position, shown in FIGS. 19 and 20, and a lowered position, shown in FIGS. 21 through 23. A toothed segment 134' protrudes radially outward from an outer circumference of the memory plate 116'. An outer edge of the toothed segment 134' is convex and includes a plurality of memory teeth 136' that are complementary to the secondary teeth 178 on the movable plate 30'. When the memory plate 116' is in the raised position, the memory teeth 136' are disengaged with or spaced apart from the secondary teeth 178 on the movable plate 30'. When the memory plate 116' is in the lowered position, the memory teeth 136' are in meshing engagement with the secondary teeth 178 on the movable plate 30'.

Figure 21:
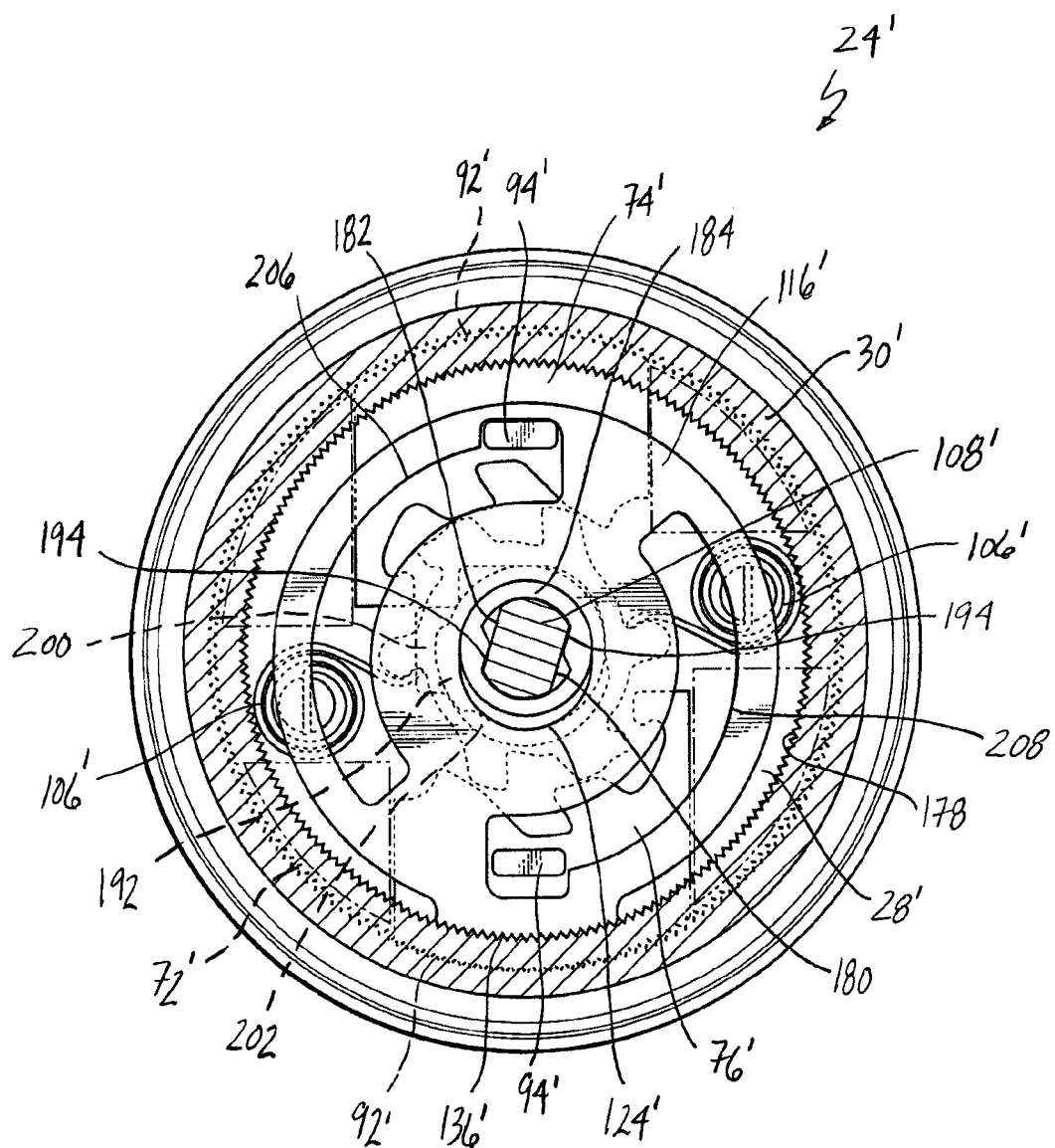
FIG. 21 is a partially cut-away, side view of the second embodiment of the disc recliner illustrating the locking mechanism in the locked condition and the memory plate in a lowered position.
Figure 22:
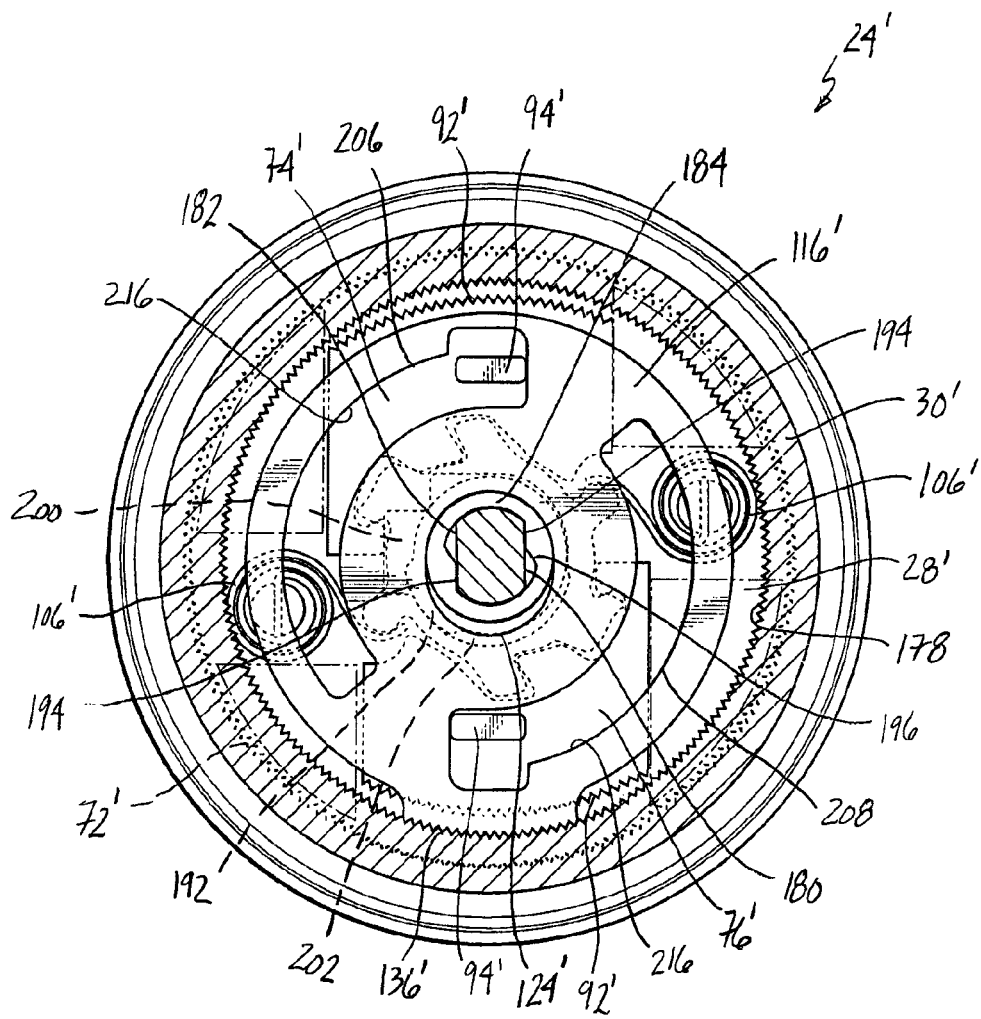
FIG. 22 is a partially cut-away, side view of the second embodiment of the disc recliner illustrating the locking mechanism in the unlocked condition and the memory plate in the lowered position to allow forward pivoting of the seat back.
Figure 24:
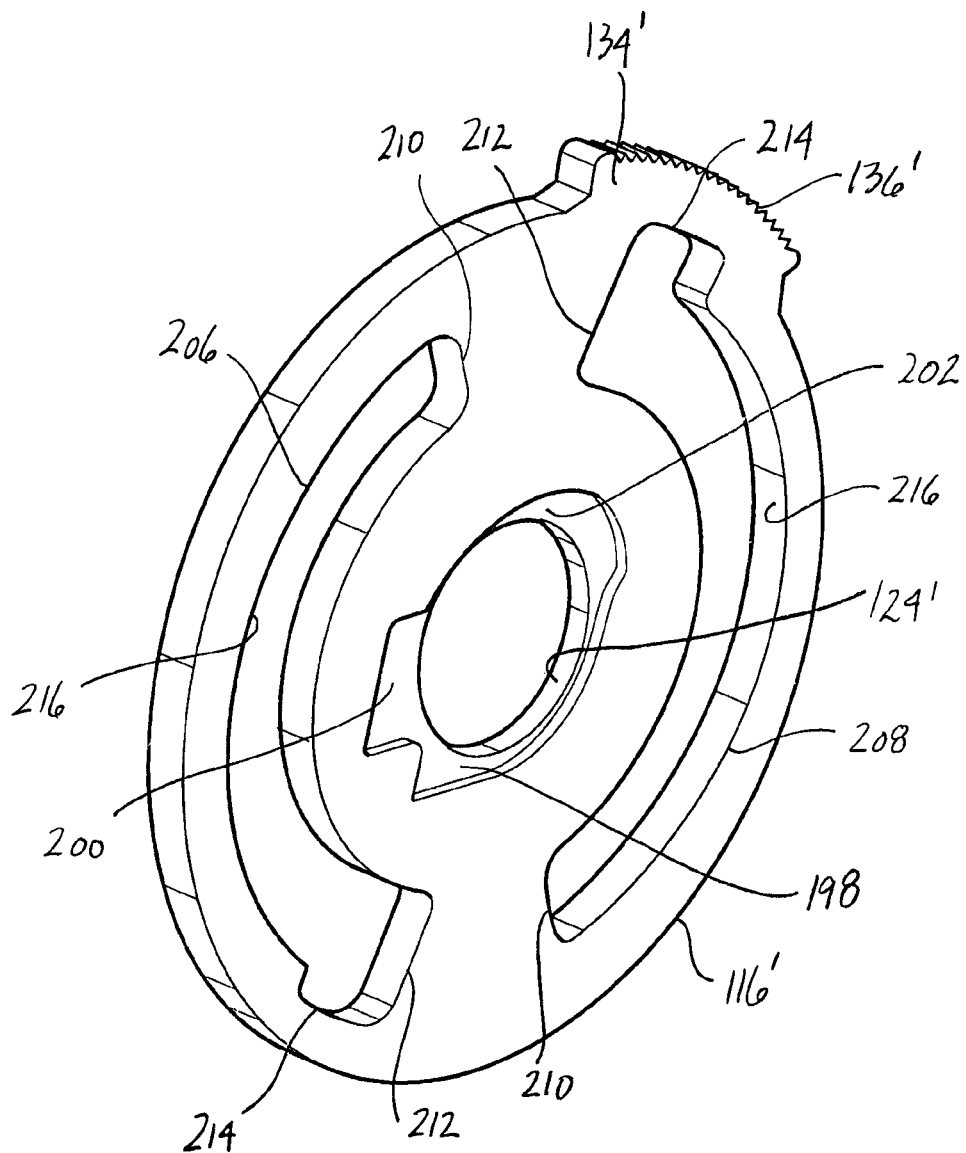
FIG. 24 is an inner perspective view of the memory plate of the second embodiment of the disc recliner.

Referring to FIG. 24, the first face 120' of the memory plate 116' includes a relief 198 formed adjacent to or circumferentially surrounding the central elongated bore 124'. The relief 198 includes a main portion 200 and an arcuate portion 202. When the disc recliner 24' is assembled, the collar 190 of the release post 184 is disposed between the cam 96' and the first face 120' of the memory plate 116' such that the key 192 on the collar 190 is disposed in the relief 198. More specifically, the key 192 is disposed in the main portion 200 of the relief 198 and engages a trailing edge 204 thereof to maintain the memory plate 116' in the raised position. When the release post 184 is rotated in the counterclockwise direction (when viewed from FIG. 19), the key 192 engages the arcuate portion 202 of the relief 198 and urges or pushes the memory plate 116' into the lowered position, as shown in FIG. 21. At the same time, the primary surfaces 194 of the release post 184 engage the first flat surface 180 and the second flat surface 182 of the primary shaft 108' and cause the primary shaft 108' to rotate in the counterclockwise direction. Rotating the primary shaft 108' in the counterclockwise direction by rotating the release post 184 in the counterclockwise direction causes the cam 96' to rotate in the counterclockwise direction. Upon sufficient rotation of the cam 96' in the counterclockwise direction the locking mechanism 32' will actuate from the locked condition to the unlocked condition, as shown in FIG. 22. A fold flat handle 152' is mounted on the first end 186 of the release post 184. Lifting a handle end 154' of the fold flat handle 152' causes the release post 184 to rotate in the counterclockwise direction.

Figure 23:
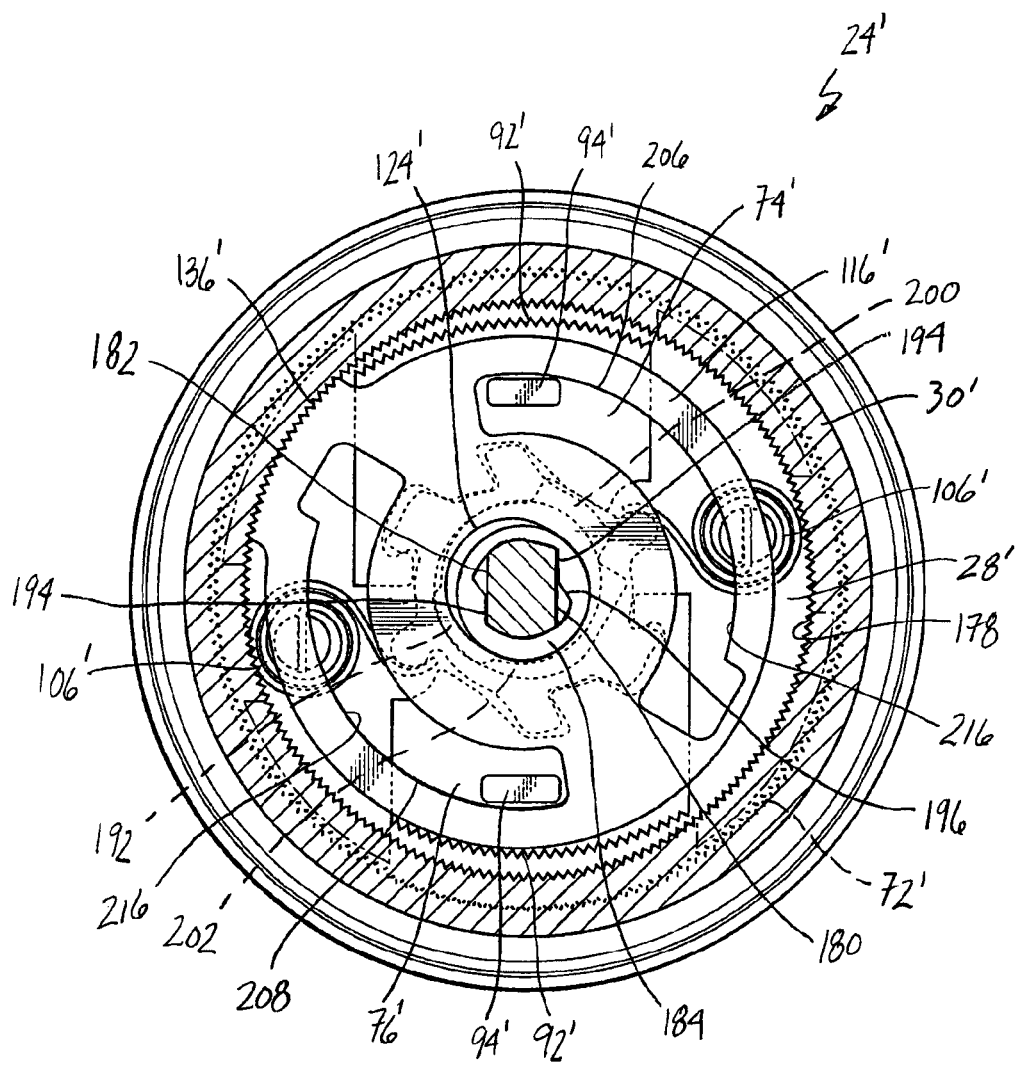
FIG. 23 is a partially cut-away, side view of the second embodiment of the disc recliner illustrating the locking mechanism in the unlocked condition and the memory plate in the lowered position when the seat back is an easy entry position.

The memory plate 116' also includes a first slot 206 and a second slot 208. Each of the first and second slots 206, 208 extends arcuately in the clockwise direction (when viewed from FIG. 16) from a first end 210 to a second end 212. The second end 212 of the second slot 208 is adjacent to the toothed segment 134' of the memory plate 116'. The second end 212 of the first slot 206 is diametrically opposed from the second end 212 of the second slot 208. The second ends 212 include a recessed portion 214 that is adapted for receiving therein the elongated tab 94' on one of the respective pawls 74', 76' when the locking mechanism 32' is in the locked condition, thereby preventing the memory plate 116' from rotating about the pivot axis 26'. It is noted that the elongated tab 94' on the pawl 74' is disposed partially in the recessed portion 214 of the first slot 206 when the memory plate 116' is in the raised position and the locking mechanism 32' is in the locked condition, as shown in FIG. 19. This allows the memory plate 116' to be moved from the raised position to the lowered position prior to the locking mechanism 32' being actuated to the unlocked condition. When the memory plate 116' is in the lowered position and the locking mechanism 32' is in the locked condition, the elongated tab 94' on the pawl 74' is disposed farther into the recessed portion 214 of the first slot 206 and the elongated tab 94' on the pawl 76' is disposed at least partially in the recessed portion 214 of the second slot 208, as shown in FIG. 21. When the memory plate 116' is in the lowered position and the locking mechanism 32' is in the unlocked condition, the elongated tab 94' on the pawl 74' is disposed in the first slot 206 and the elongated tab 94' on the pawl 76' is disposed in the second slot 208, thereby allowing the memory plate 116' to rotate about the pivot axis 26', as shown in FIG. 23. Because the memory teeth 136' are engaged with the secondary teeth 178 on the movable plate 30' when the memory plate 116' is in the lowered position the memory plate 116' will rotate with the movable plate 30'.

In operation, the seat back 14' is normally in one of a plurality of reclined seating positions. When it is desired to adjust the reclined seating position of the seat back 14', the distal end 114' of the recliner handle 110' is lifted thereby rotating the primary shaft 108' and cam 96' in the counterclockwise direction (when viewed from FIG. 19). Rotating the cam 96' in the counterclockwise direction urges the pawls 74', 76' radially inward such that the pawl teeth 92' are disengaged with the primary teeth 72' on the movable plate 30', as shown in FIG. 20. The locking mechanism 32' is now in the unlocked condition and the elongated tabs 94' on the pawls 74', 76' are disposed in the first and second slots 206, 208, respectively, such that the movable plate 30' is free to rotate relative to the fixed plate 28'. The occupant is now able to adjust the seat back 14' to any one of the plurality of reclined seating positions.

It should be noted that during adjustment of the seat back 14' between the plurality of reclined seating positions, the key 192 on the release post 184 is disposed in the main portion 200 of the relief 198 and engaged with the trailing edge 204 thereof to maintain the memory plate 116' in the raised position, as shown in FIG. 20. In the raised position, the memory teeth 136' are disengaged with the secondary teeth 178 on the movable plate 30' and therefore the memory plate 116' does not rotate with the movable plate 30' as the seat back 14' is adjusted. Once the seat back 14' is adjusted to the desired one of the plurality of reclined seating positions, the distal end 114' of the recliner handle 110' is released and the torsion springs 106' bias the cam 96' to rotate in the clockwise direction (when viewed from FIG. 20). Rotating the cam 96' in the clockwise direction urges the pawls 74', 76' radially outward such that the pawl teeth 92' are engaged with the primary teeth 72' on the movable plate 30', as shown in FIG. 19. Thus, the locking mechanism 32' is now in the locked condition preventing further pivotal movement of the seat back 14'.

When it is desired to move the seat back 14' from a previously selected reclined seating position to an easy entry position or a forwardly folded stowed position, the handle end 154' of the fold flat handle 152' is lifted thereby rotating the release post 184 in the counterclockwise direction (when viewed from FIG. 19). Rotating the release post 184 in the counterclockwise direction causes the key 192 to engage the arcuate portion 202 of the relief 198 and urges the memory plate 116' into the lowered position such that the memory teeth 136' are engaged with the secondary teeth 178 on the movable plate 30', as shown in FIG. 21. At the same time, the primary surfaces 194 of the release post 184 engage the first flat surface 180 and the second flat surface 182 of the primary shaft 108' thereby rotating the primary shaft 108' and the cam 96' in the counterclockwise direction (when viewed from FIG. 21). Continued rotation of the release post 184 rotates the cam 96' in the counterclockwise direction which urges the pawls 74', 76' radially inward such that the pawl teeth 92' are disengaged with the primary teeth 72' on the movable plate 30', as shown in FIG. 22. The locking mechanism 32' is now in the unlocked condition, the elongated tabs 94' are disposed in the first and second slots 206, 208, the memory plate 116' is engaged with the movable plate 30', and the movable plate 30' is free to rotate relative to the fixed plate 28'. The occupant is now able to move the seat back 14' to the easy entry position.

As seen in FIG. 23, when the seat back 14' is moved to the easy entry position the memory plate 116' rotates with the movable plate 30' and the elongated tabs 94' travel within the first and second slots 206, 208 toward the second ends 212. It is contemplated that the second ends 212 of the first and second slots 206, 208 or an external stop (not shown) can be used to locate the seat back 14' in the easy entry position. It should be noted that once the seat back 14' begins to pivot from the previously selected reclined seating position toward the easy entry position, the fold flat handle 152' may be released without the locking mechanism 32' returning to the locked condition. More specifically, as the movable plate 30' begins to rotate with the pivotal movement of the seat back 14', the memory plate 116' being engaged with the movable plate 30' also rotates. The elongated tabs 94' on the pawls 74', 76' engage an outer edge 216 of the respective first and second slots 206, 208, which prevents the pawls 74', 76' from moving radially outward under the bias of the torsion springs 106' transmitted through the cam 96'. Thus, the first and second slots 206, 208 maintain the pawl teeth 92' disengaged with the primary teeth 72' on the movable plate 30' as the seat back 14' pivots toward the easy entry position. In addition, the memory teeth 136' on the memory plate 116' remain engaged with the secondary teeth 178 on the movable plate 30'. As the memory plate 116' rotates with the movable plate 30', the relief 198 in the memory plate 116' moves relative to the key 192 on the collar 190 because the release post 184 remains stationary, i.e., the release post 184 does not rotate. The release post 184 does not rotate because the cam 96', and therefore the primary shaft 108', are prevented from rotating because the pawls 74', 76' are prevented from moving radially outward as described above. Thus, as the memory plate 116' rotates with the movable plate 30' the key 192 is disposed in the arcuate portion 202 of the relief 198 which maintains the memory plate 116' in engagement with the movable plate 30'.

When it is desired to return the seat back 14' to the previously selected reclined seating position, the seat back 14' is simply pivoted upward about the pivot axis 26'. As the seat back 14' is pivoted upward, the memory plate 116' is engaged and rotates with the movable plate 30'. The elongated tabs 94' on the pawls 74', 76' engage the outer edge 216 of the respective first and second slots 206, 208, which prevents the pawls 74', 76' from moving radially outward under the bias of the torsion springs 106' transmitted through the cam 96'. The memory plate 116' continues to rotate with the movable plate 30' until the seat back 14' is in the previously selected reclined seating position. With the seat back 14' in the previously selected reclined seating position, the elongated tabs 94' are aligned with the recessed portion 214 of the respective first and second slots 206, 208, as shown in FIG. 22. The pawls 74', 76' can now move radially outward under the bias of the torsion springs 106' transmitted through the cam 96' and the pawl teeth 92' re-engage with the primary teeth 72' on the movable plate 30', as shown in FIG. 21. As the torsion springs 106' urge the cam 96' to rotate in the clockwise direction the primary shaft 108' also rotates in the clockwise direction. As the primary shaft 108' is rotated clockwise the first flat surface 180 and the second flat surface 182 on the primary shaft 108' engage the primary surfaces 194 of the release post 184 and cause the release post 184 to rotate in the clockwise direction. Rotating the release post 184 in the clockwise direction causes the key 192 to engage the trailing edge 204 of the main portion 200 of the relief 198 to urge the memory plate 116' into the raised position, as shown in FIG. 19. The seat back 14' is now in the previously reclined seating position, the memory plate 116' is in the raised position, and the locking mechanism 32' is in the locked condition.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A disc recliner for providing pivotal movement of a seat back relative to a seat cushion of an automotive vehicle seat, said disc recliner comprising:

a fixed plate adapted to be mounted to one of the seat cushion and the seat back;

a movable plate adapted to be mounted to the other of the seat cushion and the seat back, the movable plate rotatably coupled to said fixed plate;

a locking mechanism disposed between said fixed and movable plates, said locking mechanism operable between a locked condition coupling said fixed and movable plates together and an unlocked condition uncoupling said fixed and movable plates to allow rotational movement of said movable plate relative to said fixed plate, wherein said movable plate includes a plurality of teeth and said locking mechanism includes a plurality of pawls mounted between said movable plate and said fixed plate, each of said plurality of pawls having a toothed surface for engagement with said plurality of teeth on said movable plate, and wherein said toothed surface on each of said plurality of pawls is engaged with said plurality of teeth on said movable plate when said locking mechanism is in said locked condition and said toothed surface on each of said plurality of pawls is disengaged with said plurality of teeth on said movable plate when said locking mechanism is in said unlocked condition; and a memory mechanism including a memory plate disposed between said fixed and movable plates, said memory plate movable between a first position disengaged with said movable plate thereby allowing adjustment of the seat back between a plurality of reclined seating positions by actuating said locking mechanism to said unlocked condition and a second position engaged with said movable plate to identify a previously selected one of said plurality of reclined seating positions and maintaining said locking mechanism in said unlocked condition thereby allowing movement of the seat back between said previously selected one of said plurality of reclined seating positions and a folded position.

2. A disc recliner as set forth in claim 1 wherein said fixed plate includes a plurality of guides for slidably guiding said plurality of pawls to engage and disengage with said plurality of teeth on said movable plate.

3. A disc recliner as set forth in claim 2 wherein said plurality of guides includes opposing first and second embossments for slidably guiding one of said plurality of pawls and opposing third and fourth embossments for slidably guiding another of said plurality of pawls.

4. A disc recliner as set forth in claim 3 wherein at least one of said third and fourth embossments includes a small tab protruding therefrom in a direction generally perpendicular to the direction of sliding movement of said plurality of pawls.

5. A disc recliner as set forth in claim 4 wherein said locking mechanism includes a cam rotatably mounted between said fixed and movable plates, said cam operatively coupled with said plurality of pawls, wherein rotation of said cam selectively moves said plurality of pawls to engage and disengage with said plurality of teeth on said movable plate.

6. A disc recliner as set forth in claim 5 including a spring for biasing said cam to urge said plurality of pawls to engage with said plurality of teeth on said movable plate.

7. A disc recliner as set forth in claim 6 including a first shaft, said cam is mounted on said first shaft for rotation therewith.

8. A disc recliner as set forth in claim 7 wherein each of said plurality of pawls includes an outer peripheral surface having said toothed surface, an inner peripheral edge for operative engagement with said cam, and an elongated tab protruding therefrom in a direction generally perpendicular to the direction of sliding movement of said plurality of pawls.

9. A disc recliner as set forth in claim 8 wherein said memory plate includes a central elongated bore for allowing said memory plate to move linearly between said first and second positions.

10. A disc recliner as set forth in claim 9 wherein said memory plate includes a toothed segment protruding radially outward for engagement with said plurality of teeth on said movable plate when said memory plate is in said second position, said toothed segment disengaged with said plurality of teeth on said movable plate when said memory plate is in said first position.

11. A disc recliner as set forth in claim 10 wherein said memory plate includes a channel extending circumferentially therearound, said channel adapted for receiving said elongated tabs on each of said plurality of pawls therein, said channel defining a main recessed portion adapted for receiving one of said elongated tabs therein and a secondary recessed portion for receiving said small tab therein.

12. A disc recliner as set forth in claim 11 wherein one of said elongated tabs is disposed in said main recessed portion of said channel and said small tab is disposed in said secondary recessed portion of said channel to prevent rotation of said memory plate when said memory plate is in said first position and said locking mechanism is in said locked condition.

13. A disc recliner as at forth in claim 12 wherein both of said elongated tabs are disposed in said channel and said small tab is disposed in said secondary recessed portion of said channel to prevent rotation of said memory plate when said memory plate is in said first position and said locking mechanism is in said unlocked condition to allow rotation of said movable plate, thereby allowing pivotal movement of the seat back between said plurality of reclined seating positions.

14. A disc recliner as set forth in claim 13 wherein both of said elongated tabs and said small tab are disposed in said channel when said memory plate is in said second position and said locking mechanism is in said locked condition.

15. A disc recliner as set forth in claim 14 wherein said channel is configured to allow rotational movement of said memory plate and pivotal movement of the seat back between said previously selected one of said plurality of reclined seating positions and said folded position when said memory plate is in said second position and said locking mechanism is in said unlocked condition.

16. A disc recliner as set forth in claim 15 wherein both of said elongated tabs and said small tab are disposed in said channel to allow rotation of said memory plate with said movable plate when said memory plate is in said second position and said locking mechanism is in said unlocked condition, thereby allowing pivotal movement of the seat back between said previously selected one of said plurality of reclined seating positions and said folded position.

17. A disc recliner as set forth in claim 16 including a first handle mounted to said first shaft for actuating said locking mechanism between said locked and unlocked conditions by operating said first handle.

18. A disc recliner as set forth in claim 17 including a second handle for actuating said memory plate between said first and second positions and actuating said locking mechanism between said locked and unlocked conditions by operating said second handle.

19. A disc recliner as set forth in claim 18 wherein said memory plate includes a slot extending arcuately therearound between opposite first and second ends, and including a lever disposed in said slot and adapted for engaging said memory plate, wherein said lever is operable for moving said memory plate between said first and second positions, and wherein said lever is biased for urging said memory plate to said first position.

20. A disc recliner as set forth in claim 19 wherein said lever includes a second shaft extending through said fixed plate, wherein said second shaft is rotated by operating said second handle.

21. A disc recliner for providing pivotal movement of a seat back relative to a seat cushion of an automotive vehicle seat, said disc recliner comprising:

a fixed plate adapted to be mounted to one of the seat cushion and the seat back;

a movable plate adapted to be mounted to the other of the seat cushion and the seat back, the movable plate rotatably coupled to said fixed plate;

a locking mechanism disposed between said fixed and movable plates, said locking mechanism operable between a locked condition coupling said fixed and movable plates together and an unlocked condition uncoupling said fixed and movable plates to allow rotational movement of said movable plate relative to said fixed plate;

a memory mechanism including a memory plate disposed between said fixed and movable plates, said memory plate movable between a first position disengaged with said movable plate thereby allowing adjustment of the seat back between a plurality of reclined seating positions by actuating said locking mechanism to said unlocked condition and a second position engaged with said movable plate to identify a previously selected one of said plurality of reclined seating positions and maintaining said locking mechanism in said unlocked condition thereby allowing movement of the seat back between said previously selected one of said plurality of reclined seating positions and a folded position; and wherein said movable plate includes a plurality of primary teeth and a plurality of secondary teeth, said locking mechanism is engaged with said plurality of primary teeth on said movable plate when said locking mechanism is in said locked condition and said locking mechanism is disengaged with said plurality of primary teeth on said movable plate when said locking mechanism is in said unlocked condition, said memory plate is disengaged with said plurality of secondary teeth when said memory plate is in said first position and said memory plate is engaged with said plurality of secondary teeth when said memory plate is in said second position.

22. A disc recliner as set forth in claim 21 wherein said locking mechanism includes a plurality of pawls mounted between said movable plate and said fixed plate, each of said plurality of pawls having a toothed surface for engagement with said plurality of primary teeth on said movable plate, and wherein said toothed surface on each of said plurality of pawls is engaged with said plurality of primary teeth on said movable plate when said locking mechanism is in said locked condition and said toothed surface on each of said plurality of pawls is disengaged with said plurality of primary teeth on said movable plate when said locking mechanism is in said unlocked condition.

23. A disc recliner as set forth in claim 22 wherein said fixed plate includes a plurality of guides for slidably guiding said plurality of pawls to engage and disengage with said plurality of primary teeth on said movable plate.

24. A disc recliner as set forth in claim 23 wherein said plurality of guides includes opposing first and second embossments for slidably guiding one of said plurality of pawls and opposing third and fourth embossments for slidably guiding another of said plurality of pawls.

25. A disc recliner as set forth in claim 24 wherein said locking mechanism includes a cam rotatably mounted between said fixed and movable plates, said cam operatively coupled with said plurality of pawls, wherein rotation of said cam selectively moves said plurality of pawls to engage and disengage with said plurality of primary teeth on said movable plate.

26. A disc recliner as set forth in claim 25 including a spring for biasing said cam to urge said plurality of pawls to engage with said plurality of primary teeth on said movable plate.

27. A disc recliner as set forth in claim 26 including a first shaft, said cam is mounted on said first shaft for rotation therewith.

28. A disc recliner as set forth in claim 27 wherein each of said plurality of pawls includes an outer peripheral surface having said toothed surface, an inner peripheral edge for operative engagement with said cam, and an elongated tab protruding therefrom in a direction generally perpendicular to the direction of sliding movement of said plurality of pawls.

29. A disc recliner as set forth in claim 28 wherein said memory plate includes a central elongated bore for allowing said memory plate to move linearly between said first and second positions.

30. A disc recliner as set forth in claim 29 wherein said memory plate includes a toothed segment protruding radially outward for engagement with said plurality of secondary teeth on said movable plate when said memory plate is in said second position, said toothed segment disengaged with said plurality of secondary teeth on said movable plate when said memory plate is in said first position.

31. A disc recliner as set forth in claim 30 wherein said memory plate includes first and second slots, each of said first and second slots including a recessed portion, wherein each of said elongated tabs on said plurality of pawls is received in one of said first and second slots when said locking mechanism is in said unlocked condition, and wherein each of said elongated tabs on said plurality of pawls is received in one of said recessed portions when said locking mechanism is in said locked condition.

32. A disc recliner as set forth in claim 31 including a release post operatively coupled between said first shaft and said memory plate, said release post adapted for moving said memory plate between said first and second positions in response to rotating said release post in a first direction.

33. A disc recliner as set forth in claim 32 wherein said first shaft extends axially through said release post and said release post is configured to allow rotation of said first shaft in said first direction to rotate said cam in said first direction thereby moving said plurality of pawls to disengage with said plurality of primary teeth on said movable plate, wherein rotation of said first shaft in said first direction does not cause rotation of said release post.

34. A disc recliner as set forth in claim 33 wherein rotation of said release post in said first direction causes said memory plate to move from said first position to said second position and causes said first shaft to rotate in said first direction thereby rotating said cam in said first direction and moving said plurality of pawls to disengage with said plurality of primary teeth on said movable plate.

35. A disc recliner as set forth in claim 34 wherein said release post includes a collar having a key and said memory plate includes a relief adapted for receiving said key therein, wherein said key engages a main portion of said relief to maintain said memory plate in said first position, and wherein said key engages an arcuate portion of said relief to move said memory plate from said first position to said second position.

36. A disc recliner as set forth in claim 35 wherein said first shaft includes first and second flat surfaces on opposite sides thereof and said release post includes a pair of spaced apart and opposing primary surfaces, said pair of spaced apart and opposing primary surfaces engage said first and second flat surfaces to rotate said first shaft in said first direction in response to rotating said release post in said first direction.

37. A disc recliner as set forth in claim 36 including a first handle mounted to said first shaft for actuating said locking mechanism between said locked and unlocked conditions by operating said first handle.

38. A disc recliner as set forth in claim 37 including a second handle for actuating said memory plate between said first and second positions and actuating said locking mechanism between said locked and unlocked conditions by operating said second handle.

* * * * *